(12) United States Patent
Tao et al.

(10) Patent No.: US 12,253,757 B2
(45) Date of Patent: Mar. 18, 2025

(54) BACKLIGHT MODULE AND DISPLAY DEVICE INCLUDING THE SAME

(71) Applicant: BOE TECHNOLOGY GROUP CO., LTD., Beijing (CN)

(72) Inventors: Ran Tao, Beijing (CN); Yongjie Xiang, Beijing (CN); Fan Yang, Beijing (CN); Zifeng Wang, Beijing (CN); Lei Cao, Beijing (CN); Yunpeng Wu, Beijing (CN); Yan Ren, Beijing (CN); Wei Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/043,293

(22) PCT Filed: Jan. 5, 2022

(86) PCT No.: PCT/CN2022/070265
§ 371 (c)(1),
(2) Date: Feb. 27, 2023

(87) PCT Pub. No.: WO2023/070941
PCT Pub. Date: May 4, 2023

(65) Prior Publication Data
US 2024/0272480 A1 Aug. 15, 2024

(30) Foreign Application Priority Data
Oct. 28, 2021 (WO) ................ PCT/CN2021/126900

(51) Int. Cl.
*G02F 1/13357* (2006.01)
*G02F 1/1335* (2006.01)

(52) U.S. Cl.
CPC .. *G02F 1/133608* (2013.01); *G02F 1/133603* (2013.01); *G02F 1/133612* (2021.01)

(58) Field of Classification Search
CPC ......... G02F 1/133608; G02F 1/133603; G02F 1/133612
See application file for complete search history.

(56) References Cited

U.S. PATENT DOCUMENTS

| 2014/0071655 | A1  | 3/2014 | Wang |
| 2020/0012151 | A1* | 1/2020 | Tang ................. G02F 1/133608 |
| 2021/0223829 | A1* | 7/2021 | Xu .......................... G06F 1/181 |

FOREIGN PATENT DOCUMENTS

| CN | 1493900 A   | 5/2004 |
| CN | 101368706 A | 2/2009 |

(Continued)

OTHER PUBLICATIONS

International Search Report received for PCT Patent Application No. PCT/CN2021/126900, mailed on Jun. 29, 2022, 8 pages (3 pages of English Translation and 5 pages of Original Document).

(Continued)

*Primary Examiner* — Tracie Y Green
(74) *Attorney, Agent, or Firm* — Myers Bigel, P.A.

(57) ABSTRACT

The present disclosure relates to a backlight module and a display device. The backlight module comprises: a lamp panel comprising a first surface and a second surface opposite to each other, the first surface comprising a light source array, and the second surface comprising a light source array driving circuit and an external terminal; a first back plate connected with the lamp panel at a side of the second surface of the lamp panel, and comprising first avoiding openings corresponding to the light source array driving circuit and the external terminal; a second back plate connected with the first back plate at a side of the first back plate away from the lamp panel, and comprising a second avoiding opening corresponding to the external terminal.

21 Claims, 17 Drawing Sheets

(56) References Cited

FOREIGN PATENT DOCUMENTS

| | | |
|---|---|---|
| CN | 202132887 U | 2/2012 |
| CN | 102506391 A | 6/2012 |
| CN | 203731220 U | 7/2014 |
| CN | 103982831 A | 8/2014 |
| CN | 104765198 A | 7/2015 |
| CN | 108336523 A | 7/2018 |
| CN | 108732822 A | 11/2018 |
| CN | 208569252 U | 3/2019 |
| CN | 110133907 A | 8/2019 |
| CN | 110187561 A | 8/2019 |
| CN | 110908188 A | 3/2020 |
| CN | 111429817 A | 7/2020 |
| CN | 212211188 U | 12/2020 |
| CN | 113156709 A | 7/2021 |
| CN | 214311194 U | 9/2021 |
| CN | 214311209 U | 9/2021 |
| CN | 113467127 A | 10/2021 |
| JP | 05-173163 A | 7/1993 |
| JP | 2004-020825 A | 1/2004 |

OTHER PUBLICATIONS

International Search Report received for PCT Patent Application No. PCT/CN2022/070265, mailed on Jul. 6, 2022, 8 pages (3 pages of English Translation and 5 pages of Original Document).
First Office Action of Chinese patent application 202280000011.2; issued Jan. 21, 2025 (14 pages, including English translation).

* cited by examiner

210

300

800

(a)

(b)

900

(a)          (b)

1000 splicing

BACKLIGHT MODULE AND DISPLAY DEVICE INCLUDING THE SAME

RELATED APPLICATIONS

The present application is a 35 U.S.C. 371 national stage application of PCT International Application No. PCT/CN2022/070265, filed on Jan. 5, 2022, which claims the priority of PCT International Application No. PCT/CN2021/126900 filed on Oct. 28, 2021, the contents of which are incorporated herein by reference in their entireties.

TECHNICAL FIELD

The present disclosure relates to the field of display technology, more particularly, to a backlight module and a display device.

BACKGROUND

As for a display device such as a liquid crystal display (LCD), its display effect is obtained by backlight modulation, such as polarizing, filtering and other modulation processing to the backlight. Therefore, a backlight module is a key component of such display device, and its brightness, uniformity and other properties will directly affect the visual effect of the display device.

In some display devices, a backlight may be provided by a plurality of lamp panels assembled together, and the assembly effect may affect overall luminous effect, and then affect the visual effect of the display device.

SUMMARY

In view of this, the present disclosure provides a backlight module and display device.

According to an aspect of the present disclosure, a backlight module is provided, comprising: a lamp panel comprising a first surface and a second surface opposite to each other, the first surface comprising a light source array, and the second surface comprising a light source array driving circuit and an external terminal; a first back plate connected with the lamp panel at a side of the second surface of the lamp panel, and comprising first avoiding openings corresponding to the light source array driving circuit and the external terminal; a second back plate connected with the first back plate at a side of the first back plate away from the lamp panel, and comprising a second avoiding opening corresponding to the external terminal.

In some embodiments, the second back plate is connected with the first back plate by riveting or gluing.

In some embodiments, the second back plate is connected with the first back plate through a plurality of connectors.

In some embodiments, the first back plate is made of a first material, the second back plate is made of a second material, and the strength of the second material is higher than that of the first material.

In some embodiments, the thickness of the first back plate is greater than that of the second back plate.

In some embodiments, at least a part of an edge of the second back plate extends beyond an edge of the first back plate.

In some embodiments, the backlight module further comprises at least one reinforcing rib fixedly connected to the second back plate at a side of the second back plate away from the first back plate.

In some embodiments, the at least one reinforcing rib comprises at least one first reinforcing rib arranged in a first direction and at least one second reinforcing rib arranged in a second direction perpendicular to the first direction.

In some embodiments, the lamp panel comprises at least one locating hole, and the first back plate comprises at least one locating post which is arranged at a side of the first back plate adjacent to the lamp panel and corresponds to the at least one locating hole respectively, and each locating post of the at least one locating post passes through a corresponding locating hole of the at least one locating hole to locate the lamp panel.

In some embodiments, at least one locating hole comprises a coarse locating hole and a fine locating hole arranged at different positions of the lamp panel, wherein the coarse locating hole is oval and the fine locating hole is circular.

In some embodiments, the backlight module further comprises an optical film layer on a first surface of the lamp panel, and a film layer fixing member for fixing the optical film layer, which comprises a film layer frame for supporting the optical film layer at an edge of the optical film layer.

In some embodiments, the backlight module further comprises at least one light-transmitting support column, which comprises a base portion and a protrusion portion on an upper surface of the base portion, wherein the protrusion portion passes through the lamp panel and protrudes from a side of the first surface of the lamp panel to support the optical film layer, and the first back plate further comprises a third avoiding opening corresponding to the at least one light-transmitting support column, so that the base portion of the at least one light-transmitting support column is clamped between the lamp panel and the second back plate.

In some embodiments, an upper surface of the base portion of the light-transmitting support column is attached to the second surface of the lamp panel.

In some embodiments, a thickness of the base portion of the light-transmitting support column is the same as a thickness of the first back plate.

In some embodiments, the protrusion portion comprises a platform portion and a column portion which is located between the base portion and the platform portion, and a lower bottom surface of the platform portion is connected with the column portion, the lower bottom surface area of the platform portion is smaller than the bottom surface area of the column portion, and the height of the platform portion is greater than that of the column portion.

In some embodiments, a height of the column portion is same as a thickness of the lamp panel.

In some embodiments, the platform portion is in a shape of a circular truncated cone, and the column portion is in a shape of a cylinder.

In some embodiments, the lamp panel further comprises a reflector arranged on the first surface side, the reflector comprises: a fourth avoiding opening corresponding to the light-transmitting support column, wherein a shape of the fourth avoiding opening is same as that of the lower bottom surface of the platform portion of the light-transmitting support column, and an area of the fourth avoiding opening is less than that of the lower bottom surface of the platform portion of the light-transmitting support column; and an incision extending outwards from an edge of the fourth avoiding opening.

In some embodiments, the fourth avoiding opening is round, and a diameter of the fourth avoiding opening is 10%-20% smaller than a diameter of the lower bottom surface of the platform portion of the light-transmitting support column.

In some embodiments, the reflector comprises a plurality of the incisions, and the plurality of the incisions have the same length.

In some embodiments, the plurality of incisions in the reflector are distributed uniformly around the fourth avoiding opening.

In some embodiments, a color of the reflector is same as that of the protrusion portion of the at least one light-transmitting support column.

In some embodiments, the film layer frame comprises a first side frame, the first side frame comprises: a side frame portion and a support platform, wherein the support platform comprises a first supporting surface and a second supporting surface which are opposite to each other, the first supporting surface is engaged with the first back plate, and the second supporting surface is configured to support the optical film layer.

In some embodiments, the film layer frame further comprises a second side frame, the second side frame and the first side frame are connected to each other by splicing.

In some embodiments, the first side frame further comprises at least one film layer hanging lug, which is arranged on the support platform and protrudes from the second supporting surface in a direction towards the optical film layer; and the optical film layer comprises at least one hanging hole respectively corresponding to the at least one film layer hanging lug, and the at least one hanging hole is respectively sleeved on corresponding film layer hanging lug to locate the optical film layer.

In some embodiments, the first side frame is further provided with at least one film layer pressing sheet, the at least one film layer pressing sheet comprises a first extension, a second extension and a bent portion between the first extension and the second extension, wherein the first extension is engaged with the side frame portion and the second extension is pressed against the optical film layer.

In some embodiments, the first side frame further comprises a yellow reflective strip which covers a side surface of the support platform.

In some embodiments, the yellow reflective strip also covers at least a part of the second supporting surface of the support platform.

In some embodiments, the external terminal comprises a plurality of terminal units, each terminal unit comprising: a first terminal and a second terminal arranged adjacent to each other, wherein an interface of the first terminal is located at a side of the first terminal away from the second terminal, and an interface of the second terminal is located at a side of the second terminal away from the first terminal.

In some embodiments, the first terminal and the second terminal are data terminals connected to a same light source array driving circuit.

In some embodiment, the terminal unit further comprises a power supply terminal.

In some embodiments, the lamp panel comprises two sub lamp panels spliced in mirror image mode, and the two sub lamp panels spliced in the mirror image mode are the same sub lamp panel.

In some embodiments, the lamp panel comprises at least one lamp panel unit, and each lamp panel unit comprises a plurality of sub lamp panels, each of the plurality of sub lamp panels comprising two terminal units, the two terminal units being respectively arranged along two opposite side edges of the sub lamp panel in a third direction, and any two adjacent sub lamp panels in the plurality of sub lamp panels in the third direction being connected by adjacent terminal units.

In some embodiments, the backlight module further comprises: a touch adapter, which is arranged along an edge on a side of the second back plate away from the first back plate, and a projection of the touch adapter on the lamp panel unit is located between the adjacent terminal units of two sub lamp plates adjacent in a fourth direction in the lamp panel unit, wherein the fourth direction is perpendicular to the third direction.

In some embodiments, the touch adapter comprises at least one of a capacitive touch adapter and an electromagnetic touch adapter.

According to another aspect of the present disclosure, a display device is provided, comprising the backlight module described in the above aspects.

In some embodiments, the display device further comprises an overall machine frame, wherein an edge of the second back plate of the backlight module is connected with the overall machine frame.

These and other aspects of the present disclosure will be clear from and elucidated with reference to the embodiments described hereinafter.

BRIEF DESCRIPTION OF THE DRAWINGS

Further details, features and advantages of the present disclosure are disclosed in the following description of exemplary embodiments with reference to the accompanying drawings, in which.

Figure 1:
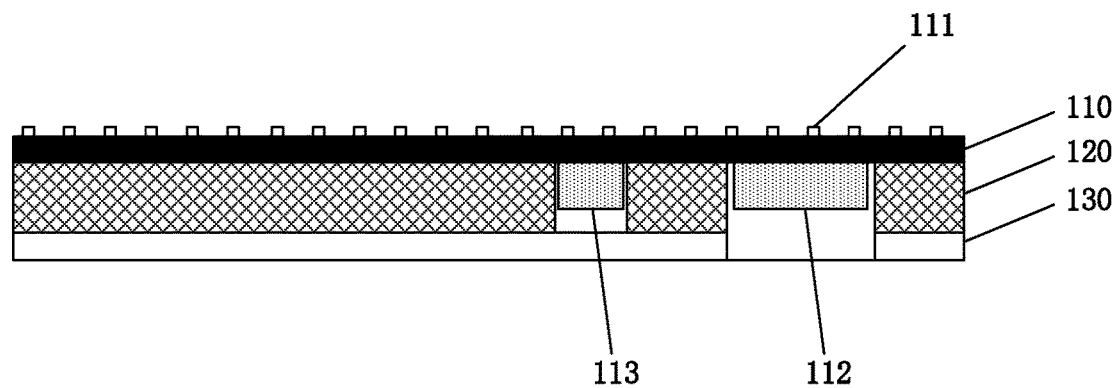
FIG. 1 is a schematic structural view of a backlight module according to some embodiments of the present disclosure.

It should be understood that the drawings are only schematic, not necessarily drawn to scale, and may highlight essential features for explaining the embodiments of the present disclosure, while omitting some other features.

DETAILED DESCRIPTION OF THE DISCLOSURE

It should be understood that although terms "first" and "second" can be used to describe various devices, features or parts herein, these devices, features or parts should not be limited by these terms. These terms are only used to distinguish one (or a group of) device, feature or part from another (or another group of) device, feature or part. It should also be understood that "a plurality" referred in this disclosure can mean two or more without other restrictions. It should also be understood that the words "connected", "coupled" or the like mentioned in this disclosure may refer to a situation of direct connecting and direct coupling, and may also refer to a situation of indirect connecting and indirect coupling realized via one or more intermediate device, component, etc. In some embodiments, "connecting" and "coupling", "engaging" or similar words can refer to fixed connection or detachable connection. For example, in the description that one element or device is connected to another element or device, it may mean that one element or device is fixedly connected to another element or device, or that one element or device is detachably connected to another element or device. In this context, a detachable connection between a component A and a component B means that the two components are connected together by detachable and/or removable connecting ways such as bonding, snapping, riveting, screwing, interference fitting, etc., and the connection between the component A and the component B can be removed by ways such as heating, pulling, pressing, impacting, vibrating, etc. without damaging and/or destroying the component A and the component B, so as to facilitate replacement and recycle of the components.

Generally speaking, backlight modules can be classified into two types: front light type and back light type, wherein the back light type can be classified into two different structures: edge-backlit type and direct-backlit type according to the position of the light source. As for the direct-backlit type backlight module, the light source is placed directly beneath the display structure such as the liquid crystal panel. After light mixing and/or other optical processing, the light emitted by the light source can illuminate the display structure such as the liquid crystal panel, and finally present desired display effects after modulation. However, the applicant found that for the backlight module obtained by assembling a plurality of lamp panels, especially when the backlight is provided by dense small light sources such as miniLEDs, due to the limitation of light mixing distance, higher requirements will be put forward in terms of flatness and accuracy of the assembly. For example, as for a miniLED type backlight module, taking a 65-inch display device as an example, the backlight module may be composed of 8 lamp panels, each lamp panel may have 2,688 lamps, a horizontal lamp spacing is 7.44 mm, a vertical lamp spacing is 7.1 mm, and the light mixing distance of the backlight may be only 5 mm or even lower. In such an example, due to the small light mixing distance, the lack of flatness and accuracy of the assembly will significantly affect the light mixing effect, and ultimately negatively affect the display effect.

Based on the above considerations, the applicant proposes a backlight module with a double-layer back plate structure, which helps to assemble a plurality of lamp panels with high flatness and accuracy, and enhances the strength of the back plate structure.

FIG. 1 is a schematic structural view of a backlight module 100 according to some embodiments of the present disclosure. As shown in FIG. 1, the backlight module 100 may comprise a lamp panel 110, a first back panel 120 and a second back panel 130. The lamp panel 110 may be a lamp driver-in-one type, which may comprise a first surface and a second surface opposite to each other, such as an upper surface and a lower surface in the figure, wherein the first surface may include a light source array 111, and the second surface may include a light source array driving circuit 112 and an external terminal 113. The first back plate 120 may be connected to the lamp panel 110 at a side of the second surface of the lamp panel 110, and includes first avoiding openings corresponding to the light source array driving circuit 112 and the external terminal 113. The second back plate 130 may be connected to the first back plate 120 at a side of the first back plate 120 away from the lamp panel 110, and includes a second avoiding opening corresponding to the external terminal 112. The first back plate can be configured to assemble a plurality of lamp panels with high flatness and accuracy, and the second back plate can compensate for the strength loss of the first back plate caused by the avoiding openings, which is helpful to enhance the strength of the whole back plate structure.

Figure 2A:
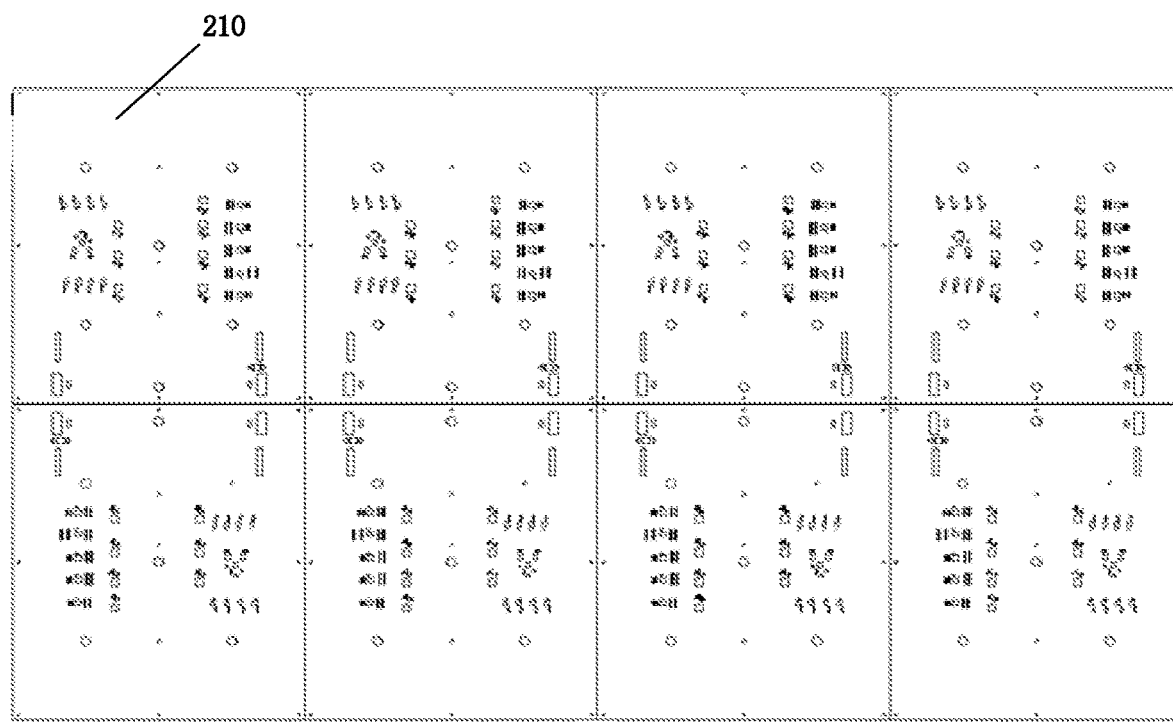
FIGS. 2A and 2B are schematic views of lamp panels according to some embodiments of the present disclosure.
Figure 2B:
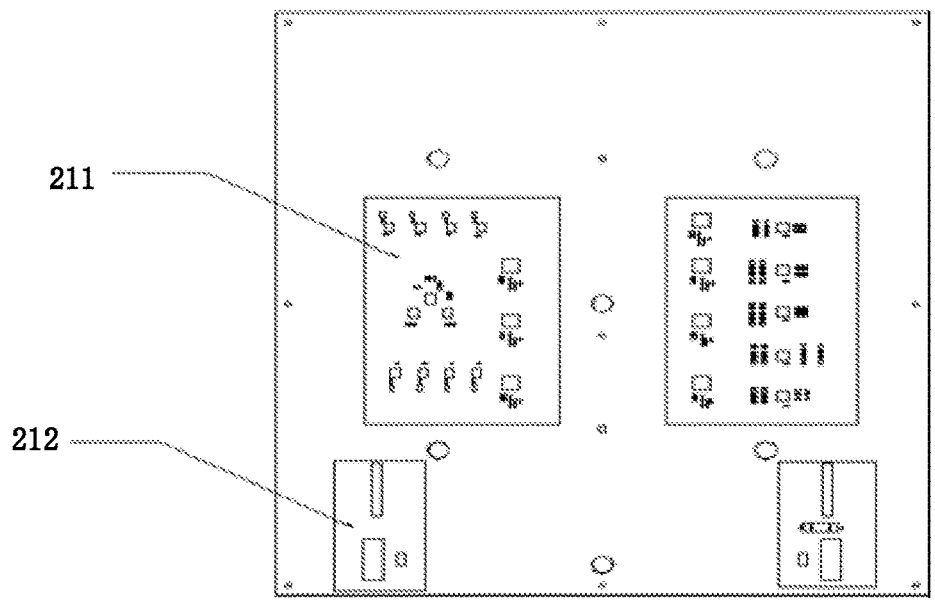

Optionally, the lamp panel 110 can be a single lamp panel or a spliced lamp panel formed by splicing a plurality of sub-lamp panels. For example, FIG. 2A is a schematic view of a second surface of the spliced lamp panel 200 according to some embodiments of the present disclosure. As shown in FIG. 2A, the spliced lamp panel 200 is made up of eight separate sub-lamp panels 210. As shown in FIG. 2B, each sub-lamp panel 210 includes a light source array driving circuit 211 and an external terminal 212. The light source array driving circuit 211 can be configured to generate driving current that can be used by the light source array on the first surface of the sub-lamp panel 210, and the external terminal 212 can be configured to externally connect to a power supply or other circuit structure. Optionally, the light source driving circuits and the external terminals can be disposed at different areas, that is, the light source driving circuits can be concentrated in one or more areas, and the external terminals can be concentrated in another one or more areas, so as to facilitate the position avoiding design of the back plate and the connection with other circuit structures. Each of the sub-lamp panels 210 can be spliced in such a way that an upper row and a lower row are mirror-imaged symmetrically, that is, as shown in FIG. 2A, the area of the external terminals is concentrated in the middle of the two rows of sub-lamp panels, so as to be externally connected to a power supply or other circuit structure in a unified way. It should be understood that the spliced lamp panel 200 can also be spliced by other numbers of sub-lamp panels in other patterns, and this disclosure is not limited to this.

Optionally, the light source array included in the first surface of the lamp panel may be an array of solid-state lighting elements such as an LED array, a miniLED array, a micro-LED array, or an array of halogen tungsten lamps, electroluminescent devices, cold cathode fluorescent lamps, cathode emission lamps or other light emitting elements.

Figure 3:
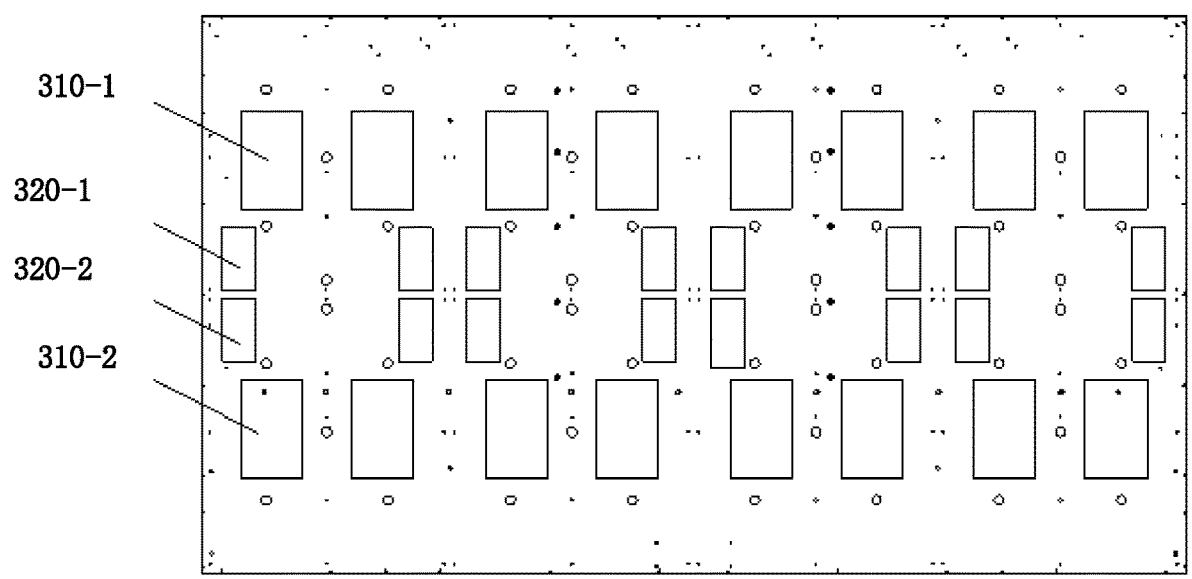
FIG. 3 is a schematic view of a first back plate according to some embodiments of the present disclosure.

For example, FIG. 3 is a schematic view of a first back plate 300 according to some embodiments of the present disclosure, which can be configured to assemble the spliced lamp panel 200. As shown in FIG. 3, the first back plate 300 includes first avoiding openings corresponding to the light source array driving circuits and the external terminals, for example, avoiding openings 310-1 or 310-2 corresponding to the light source array driving circuits 211 shown in FIG. 2B and avoiding openings 320-1 or 320-2 corresponding to the external terminals 212 shown in FIG. 2B. It can be understood that the light source array driving circuits and the external terminals of the lamp panel can be convex relative to the plane of the second surface of the lamp panel. Therefore the sizes of the avoiding openings can be equal to or slightly larger than the corresponding light source array driving circuit or external terminal areas, so that the light source array driving circuits or external terminals can be accommodated by the corresponding avoiding opening without affecting the tight engagement of other positions of the second surface of the lamp panel with the first back plate.

In some embodiments, a thickness of the first back plate may be greater than a maximum protruding height of the light source array driving circuit of the lamp panel. For example, if the maximum protruding height of the light source array driving circuit is 2.0 mm, the first back plate may be 2.5 mm thick or has other thicknesses greater than 2.0 mm. In such an embodiment, the light source array driving circuit can be accommodated in a cavity formed by the corresponding avoiding opening of the first back plate and the surface of the second back plate facing the first back plate. This makes it unnecessary to keep avoiding the position of the light source array driving circuit at the corresponding position of the second back plate, and at the same time, the packaging of the light source array driving circuit is realized.

Figure 4:
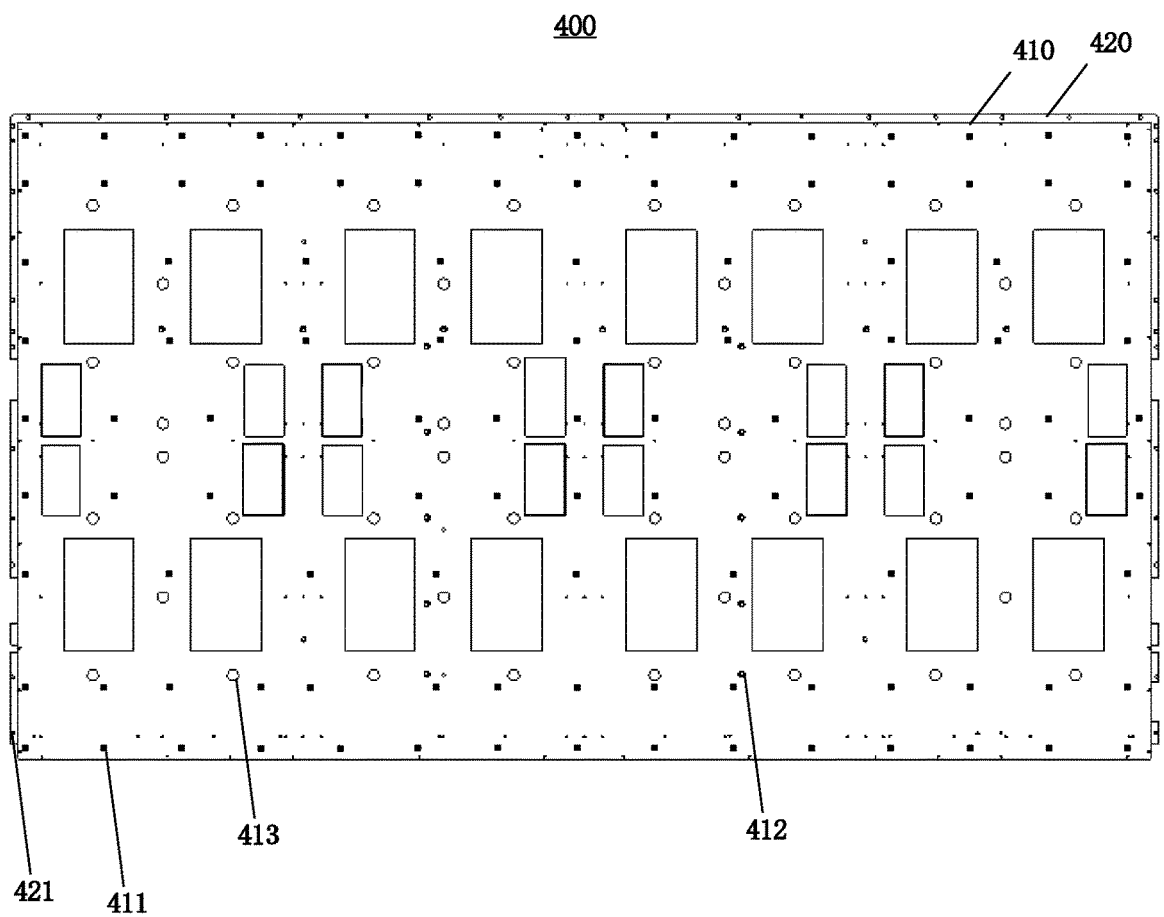
FIG. 4 is a schematic view of a first back plate and a second back plate assembled together according to some embodiments of the present disclosure.

FIG. 4 is a schematic view of a double-layer back plate structure 400 after assembling a first back plate and a second back plate according to some embodiments of the present disclosure. As shown in FIG. 4, the double-layer back plate structure 400 includes the first back plate 410 and the second back plate 420 assembled together. For example, the double-layer back plate structure 400 can be configured to assemble the spliced lamp panel 200.

In some embodiments, the second back plate can be connected with the first back plate by riveting or gluing. For example, in FIG. 4, the first back plate 410 and the second back plate 420 may be connected by riveting points characterized by solid squares as indicated by a reference numeral 411. For example, the first back plate 410 and the second back plate 420 may have through holes at corresponding positions, and rivets may pass through the corresponding through holes of the first back plate 410 and the second back plate 420 to tightly engage them together. Additionally or alternatively, the first back plate 410 and the second back plate 420 may also be connected by gluing, such as a plurality of gluing points or a plurality of gluing strips. Connecting the first back plate and the second back plate by riveting or gluing helps to improve the connection strength, and further improve the strength of the assembled backlight module. Additionally or alternatively, the first back plate and the second back plate can also be connected by other ways, such as screws or the like. However, compared with the solution of connecting the first back plate and the second back plate by screws, riveting or gluing can achieve engagement with higher flatness by fewer connecting points.

In some embodiments, in order to further improve the flatness and strength of the engaged first back plate and second back plate, the second back plate may be connected with the first back plate through a plurality of connectors. The plurality of connectors can be a plurality of riveting points, a plurality of gluing points, a plurality of threaded connection points, etc. Optionally, the plurality of connectors can be uniformly arranged.

In some embodiments, the first back plate and the second back plate may be made of materials with different strengths. Specifically, the first back plate may be made of a first material, the second back plate may be made of a second material, and a strength of the second material may be higher than that of the first material. Strength can refer to the ability of a material to resist permanent plastic deformation and fracture under the action of static load, and can be characterized by an amount of maximum load per square meter of the material that can be tolerated by the material. Its unit can be N/m2 or Pa, etc. The higher the strength of the material is, the greater the load it can bear will be. For example, the strength ratio of the second material to the first material may be higher than 1, such as in a range of 1 to 5, 1 to 10, or even 1 to 15. In such an embodiment, because the material strength of the second back plate is high, it helps to enhance the strength of the backlight module. At the same time, it is possible to provide a good strength enhancement effect by the second back plate with a smaller thickness, thus helping to enhance the strength of the backlight module and to reduce the overall thickness of the backlight module. For example, the first back plate may be a 2.5 mm thick aluminum back plate, and the second back plate may be a 1 mm stainless steel back plate. In this example, due to the high thermal conductivity of aluminum, it helps to provide better heat dissipation capacity for the light source array driving circuits. At the same time, because the strength of stainless steel is higher than that of aluminum, the strength of the whole back plate can be significantly improved with a thinner size. Optionally, the first back plate and the second back plate can also be made of other materials and/or have other thicknesses. For example, the thickness of the first back plate may be determined according to the thickness of the light source array driving circuit on the lamp panel, and it may be set to be larger than the thickness of the light source array driving circuit. For example, if the thickness of the light source array driving circuit is about 2 mm, the thickness of the first back plate can be set to be greater than 2 mm, such as 2.1 mm, 2.2 mm, 2.3 mm, 2.4 mm, 2.5 mm, 2.6 mm or more. The thickness of the second back plate may be lower than, equal to or higher than that of the first back plate. To reduce the thickness of the overall back plate, the thickness of the second back plate may be lower than that of the first back plate, that is, the thickness ratio of the first back plate to the second back plate may be greater than 1. For example, in the example where the first back plate is an aluminum back plate of 2.5 mm, the thickness of the stainless-steel back plate may be set to 2 mm, 1.5 mm, 1 mm, 0.9 mm, 0.8 mm, etc.

In some embodiments, at least a part of an edge of the second back plate may extend beyond an edge of the first back plate. Therefore, at least a part of the edge of the second back plate can be lapped on, for example, an overall machine frame of the display device, thereby fixing the backlight module at a proper position in the display device. For example, as shown in FIG. 4, the second back plate 420 extends beyond the first back plate 410 in three directions, i.e., at an upper side, a left side and a right side. Therefore, step structures are formed at the upper side, the left side and the right side of the back plate structure 400 for connecting and assembling the back plate structure 400 with the overall machine frame. Specifically, an edge portion of the second back plate 420 extending beyond the first back plate 410 can be lapped on the overall machine frame and locked by screws. For example, the back plate structure 400 can be locked on the overall machine frame by using screws to pass through screw holes indicated by 421 and corresponding screw holes in the overall machine frame. Optionally, the lower side of the back plate structure 400 may be connected to the overall machine front frame of the display device through an adapter. It should be understood that FIG. 4 is only an example. Actually, the second back plate and the first back plate may have other shapes besides rectangular shape, such as circular shape, oval shape, etc. More or less edge portions of the second back plate may extend beyond the first back plate. This disclosure is not particularly limited in this respect.

Optionally, the second back plate may be provided with other features, such as screw posts for fixing various boards the whole machine, besides the avoiding openings corresponding to the light source array driving circuits and optional screw holes for connecting to the front frame of the whole machine.

Optionally, the avoiding openings in the first back plate and the second back plate can be obtained in various ways, for example, by molding or by punching, cutting or otherwise forming openings in the whole plate. Comparatively speaking, the solution of molding is helpful to improve strength, but an initial mold development cost is higher, so it is more suitable for mass production. The solution of forming openings in the whole plate can save the cost of mold development, thus helping to reduce the cost, which is more suitable for small and medium batch production, but its overall strength is poorer than that of the back plate obtained by molding.

In some embodiments, the overall strength of the double-layer back plate structure can be further enhanced by providing reinforcing ribs. Specifically, at least one reinforcing rib can be provided and fixedly connected to the second back plate at a side of the second back plate away from the first back plate. For example, at least one first reinforcing rib in a first direction and at least one second reinforcing rib in a second direction may be provided, and the first direction may be perpendicular to the second direction. In this way, the overall strength of the double-layer back plate structure can be enhanced in different directions.

Figure 5:
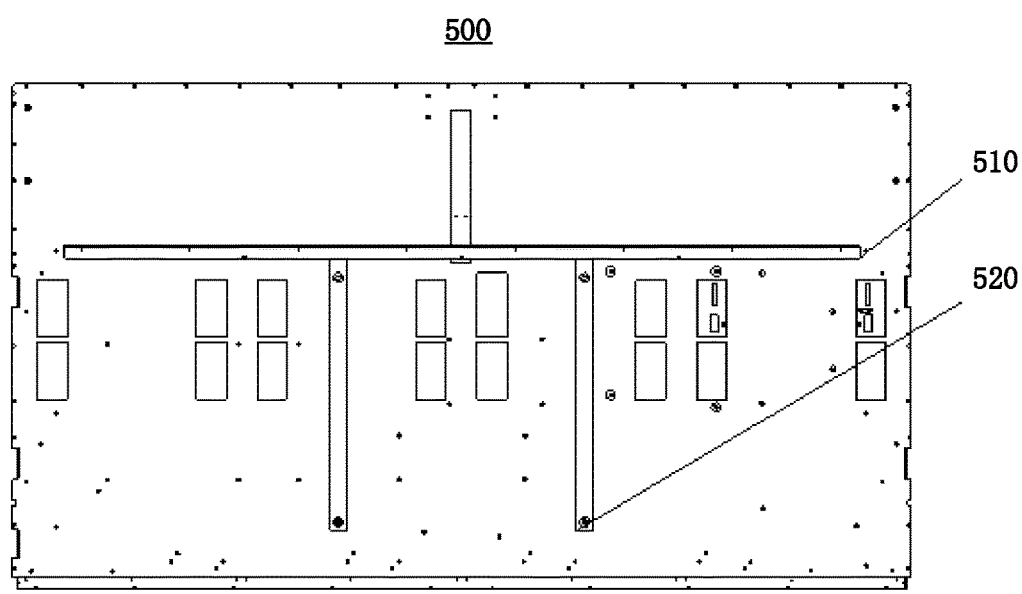
FIG. 5 is a schematic view of a back plate with reinforcing ribs according to some embodiments of the present disclosure.

For example, FIG. 5 is a schematic view of a back plate structure 500 with reinforcing ribs according to some embodiments of the present disclosure. As shown in FIG. 5, the back plate structure 500 includes a horizontal rib 510 arranged in the horizontal direction and two vertical ribs 520 arranged in the vertical direction. Optionally, the reinforcing ribs can be connected to the first back plate or the second back plate through threaded connectors so as to be fixedly connected to the side of the second back plate away from the first back plate. For example, screw holes may be provided in the reinforcing ribs, through holes may be provided at corresponding positions of the second back plate, and countersunk screw holes may be provided at corresponding positions of the first back plate. During assembly, countersunk screws may be screwed into the countersunk screw holes of the first back plate and locked onto the reinforcing ribs, so that the second back plate is clamped between the first back plate and the reinforcing ribs, so that the reinforcing ribs can be fixedly connected to the side of the second back plate away from the first back plate. For example, the back plate structure 500 shown in FIG. 5 can be a combination of the double-layer back plate structure 400 shown in FIG. 4 and the horizontal rib 510 and the vertical ribs 520, wherein the horizontal rib 510 and the vertical ribs 520 can be fixedly connected with the first back plate and the second back plate through the countersunk screw holes, indicated by small hollow circles indicated by 412 in FIG. 4, in the first back plate and the through holes at the corresponding positions in the second back plate. Optionally, the reinforcing ribs can also be fixedly connected to the side of the second back plate away from the first back plate by other connecting methods other than screw connection.

In addition, for example, the reinforcing ribs can be made of materials with high strength, such as galvanized steel plates and the like. Optionally, besides the screw holes for fixing the reinforcing ribs to the first and second back plates, the reinforcing ribs may be provided with other features, such as wall hanging posts for fixing the display device to a wall or other wall structures.

Optionally, the lamp panel can be connected to the first back plate by various suitable ways, such as screwing, riveting, gluing, etc. In addition, in order to determine the position of the lamp panel on the first back plate more accurately, corresponding locating elements can be arranged on the lamp panel and the first back plate. For example, one of the lamp panel and the first back plate is provided with locating holes, and the other is provided with corresponding locating posts. Alternatively, the lamp panel and the first back plate may be provided with locating notches or locating protrusions of the same shape at corresponding positions, etc.

In some embodiments, the position of the lamp panel on the first back plate can be more accurately determined by the locating holes and the locating posts. Specifically, the lamp panel may include at least one locating hole, and the first back plate may include at least one locating post arranged on one side of the first back plate adjacent to the lamp panel and corresponding to the at least one locating hole, and each of the at least one locating post may respectively pass through the corresponding one of the at least one locating hole to locate the lamp panel. Optionally, the number of locating holes in one lamp panel can be 1, 2, 3, 4 or more, and the at least one locating hole can be arranged in various shapes such as linear, triangular, rectangular, diamond-shaped, etc., and each locating hole can have the same or different shapes and/or sizes. Optionally, the at least one locating post can also have the same or different shape and/or size. For example, it can be cylindrical, prismatic, conical, truncated conical, truncated pyramidal and other shapes. The shape and size of each locating post can be set in accordance with the corresponding locating holes.

Figure 6:
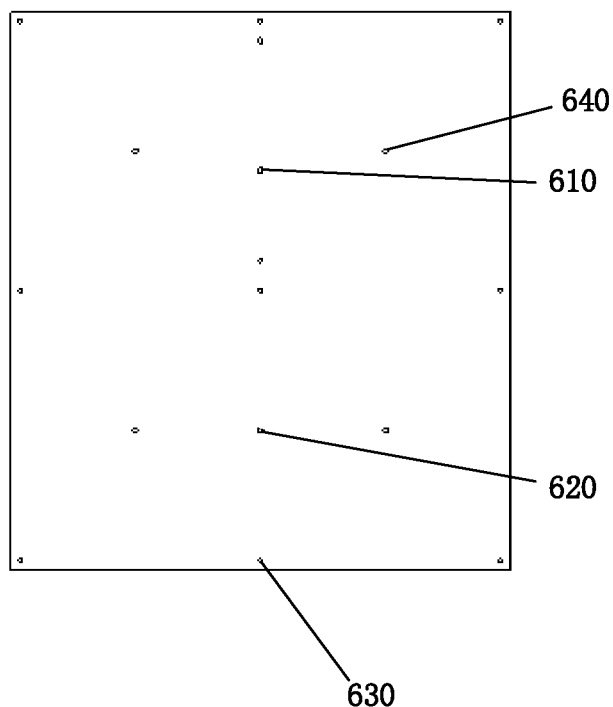
FIG. 6 is a schematic view of lamp panel locating holes according to some embodiments of the present disclosure.

For example, FIG. 6 is a schematic view of a lamp panel locating hole according to some embodiments of the present disclosure. As shown in FIG. 6, the lamp panel 600 has two locating holes 610 and 620 arranged at different positions. The two locating holes help to determine the position of the lamp panel on the first back plate more accurately, and avoid potential rotational displacement caused by only one locating hole. Optionally, the locating hole 610 may be a coarse locating hole and set as an elliptical hole, and the locating hole 620 may be a fine locating hole and set as a circular hole. This setting can be more convenient for installation. The first back plate is provided with protruding locating posts at positions corresponding to the coarse locating hole 610 and the fine locating hole 620. The diameter of the locating post on the first back plate may be slightly smaller than that of the corresponding locating hole in the lamp panel, for example, 0.1 mm smaller, so that the locating hole can be smoothly sleeved on the corresponding locating post when the lamp panel is installed. When the lamp panel 600 is placed on the first back plate, the locating posts on the first back plate can pass through the corresponding locating holes 610 and 620, thus realizing the locating of the lamp panel 600 on the first back plate. Subsequently, the lamp panel can be locked on the first back plate by screws. For example, screws can pass through the screw holes indicated by 630 and the corresponding screw holes in the first back plate and be locked to fix the lamp panel to the first back plate. For a spliced lamp panel obtained by splicing a plurality of sub-lamp panels, each sub-lamp panel can be located and locked sequentially to install each sub-lamp panel at a corresponding position on the first back plate.

Figure 7:
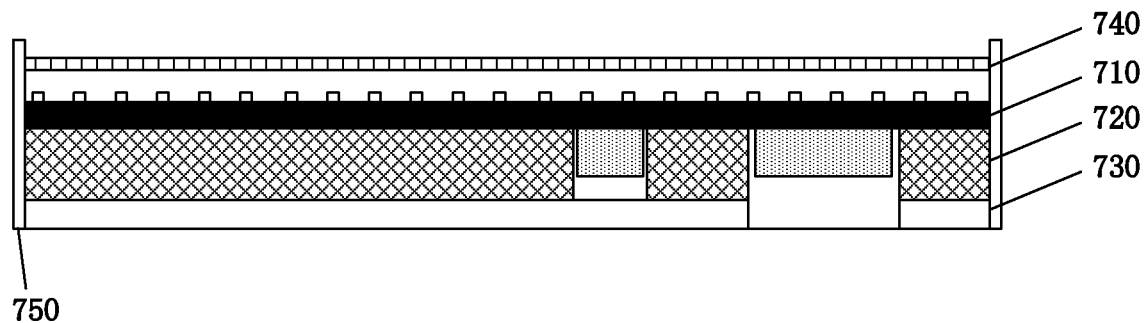
FIG. 7 is another schematic structural view of a backlight module according to some embodiments of the present disclosure.

FIG. 7 is a schematic structural view of a backlight module 700 according to some embodiments of the present disclosure. The backlight module 700 includes a lamp panel 710, a first back panel 720 and a second back panel 730, and the details and features thereof may be the same as those of the lamp panel 110, the first back panel 120 and the second back panel 130 in the backlight module 100 described herein with reference to FIG. 1, and will not be repeated herein. In addition, the backlight module 700 may further include an optical film layer 740 located on the first surface of the lamp panel 710, and a film layer fixing member 750 for fixing the optical film layer 740. The film layer fixing member 750 may include a film layer frame for supporting the optical film layer 740 at its edge.

The optical film layer 740 may be a film layer used to improve light emitting effect, such as improving the uniformity and brightness of the emitted light, improving the color temperature and tone, and the like. According to actual needs, the optical film layer 740 may be a single film layer or a plurality of film layers. For example, the optical film layer 740 may include one or more of a diffusion plate, a quantum dot film, a polarizing film, a brightness enhancement film, and the like.

In some embodiments, the backlight module may include at least one light-transmitting support column to better support the optical film layer arranged above the light source array of the lamp panel, so as to ensure the flatness of the optical film layer and avoid unexpected collapse of the optical film layer.

Figure 8A:
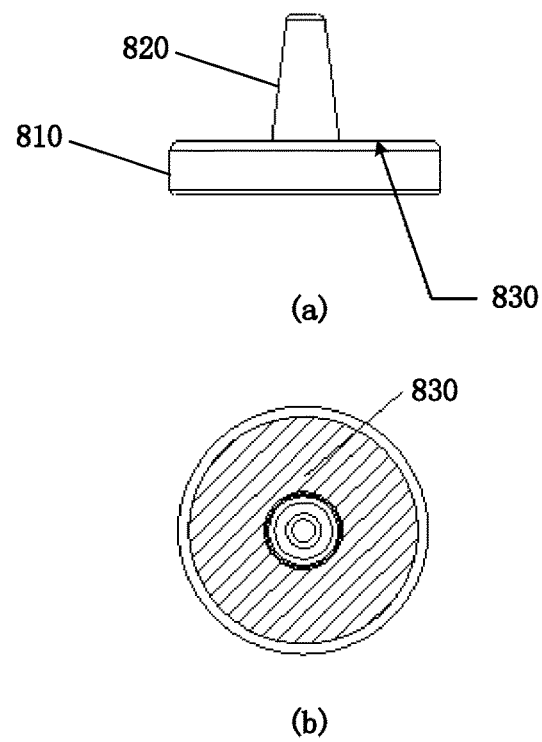
FIG. 8A is a schematic structural view of a light-transmitting support column according to some embodiments of the present disclosure.
Figure 8B:
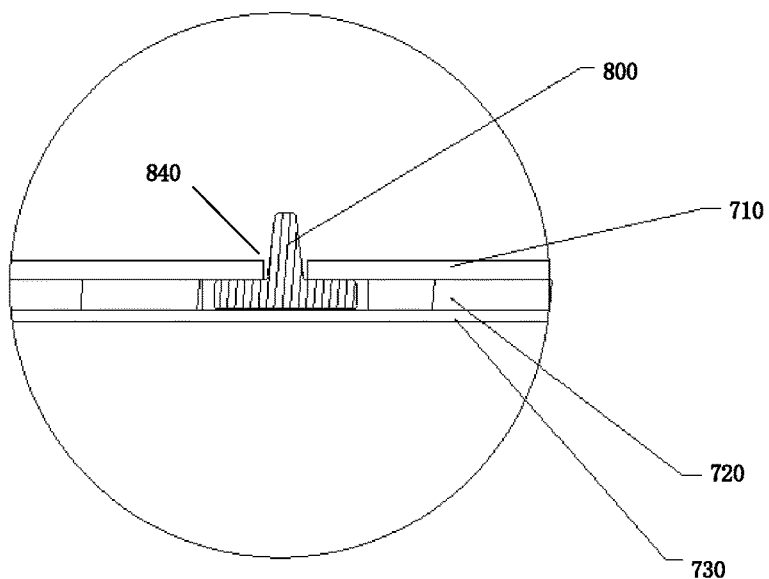
FIG. 8B is a schematic assembly view of a light-transmitting support column according to some embodiments of the present disclosure.

FIG. 8A is a schematic structural view of a light-transmitting support column 800 according to some embodiments of the present disclosure. In FIG. 8A, (a) and (b) are respectively a side view and a top view of a light-transmitting support column 800 according to some embodiments of the present disclosure. As shown in FIG. 8A, the light-transmitting support column 800 includes a base portion 810 and a protrusion portion 820 on the upper surface of the base portion 810. The base portion 810 may be a columnar body such as a cylinder or a prism, e.g., a disk shape as shown in FIG. 8A (i.e., a cylinder with a lower height). The protrusion portion 820 can be a platform such as the circular truncated cone as shown in FIG. 8A or a truncated pyramid. Optionally, the protrusion portion 820 can also be a columnar body such as a cylinder or a prism. As shown in FIG. 8A, the upper surface of the base portion 810 of the light-transmitting support column 800 can be provided with a back glue 830 for bonding the base portion 810 to the second surface of the lamp panel, and the back glue 830 can be 0.1 mm or other thickness, for example. FIG. 8B is a schematic assembly view of a light-transmitting support column 800 according to some embodiments of the present disclosure.

When the light-transmitting support column 800 is assembled to the backlight module, as shown in FIG. 8B, the upper surface of the base portion 810 of the light-transmitting support column 800 can be adhered or attached to the second surface (the lower surface in FIG. 8B) of the lamp panel 710 through the back glue 830. The protrusion portion 820 can pass through the lamp panel 710 and protrude from the first surface (the upper surface in FIG. 8B) side of the lamp panel 710 to support the optical film layer. As shown in FIG. 8B, the first back plate 720 can include a third avoiding opening corresponding to the base portion 810 of the light-transmitting support column 800, so that the based portion 810 of the light-transmitting support column 800 can be clamped between the lamp panel 710 and the second back plate 730. As shown in FIG. 8B, the thickness of the base portion 810 of the light-transmitting support column 800 can be same as that of the first back plate 720, so that the upper surface and the lower surface of the base portion 810 of the light-transmitting support column 800 are closely fitted with the lamp panel 710 and the second back plate 730 respectively, so that the light-transmitting support column 800 can be more firmly clamped between the lamp panel 710 and the second back plate 730.

In accordance with the assembly schematic view as shown in FIG. 8B, the light-transmitting support column 800 can be assembled to the lamp panel 710 at first, i.e., adhered or attached to the second surface of the lamp panel 710 by the back glue 830. The lamp panel 710 may have corresponding light-transmitting support column holes, so that the protrusion portions 820 of the light-transmitting support columns 800 can protrude from the first surface of the lamp panel 710 via the light-transmitting support column holes. Subsequently, when the lamp panel 710 is assembled to the first back plate 720, the base portion 810 of the light-transmitting support column 800 can pass through the corresponding third avoiding opening of the first back plate 720. Then, when the second back plate 730 is assembled to the first back plate 720, the bottom surface of the base portion 810 of the light-transmitting support column 800 may be disposed on the second back plate 730 (the second back plate 730 does not include an avoiding opening for the light-transmitting support column). Therefore, as the lamp panel 710, the first back plate 720 and the second back plate 730 are assembled together in sequence, the base portion 810 of the light-transmitting support column 800 can be clamped between the lamp panel 710 and the second back plate 730. Thereafter, even if the back glue 830 at the upper surface of the base portion 810 fails, the light-transmitting support column can still be kept in place without displacement. Schematically, refer to FIG. 4, which shows the arrangement of the third avoiding opening 413 on the first back plate 410. Optionally, the third avoiding opening on the first back plate 720 as shown in FIG. 8B can also be similarly arranged.

Figure 8C:
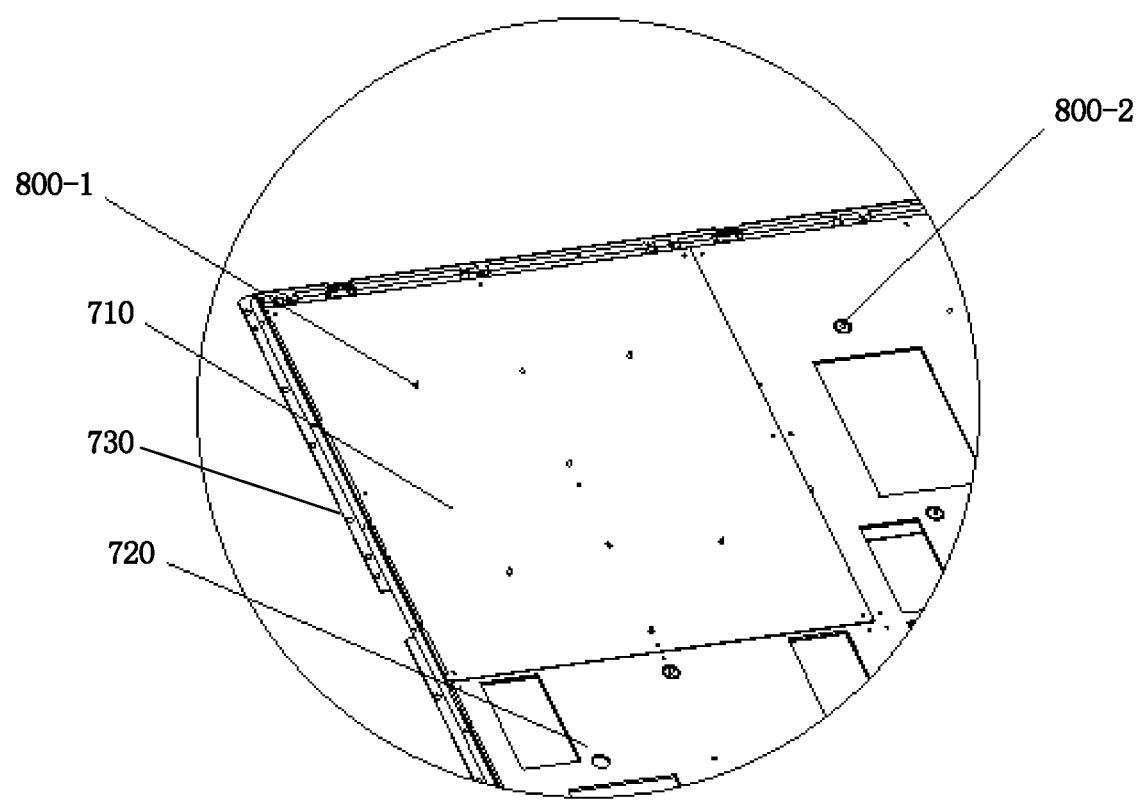
FIG. 8C is a schematic view of distribution of light-transmitting support columns in the backlight module according to some embodiments of the present disclosure.

FIG. 8C is a schematic view of distribution of light-transmitting support columns in the backlight module according to some embodiments of the present disclosure. As shown in FIG. 8C, the backlight module can include a plurality of uniformly distributed light-transmitting support columns, e.g., the light-transmitting support columns 800-1, 800-2 etc. as shown in FIG. 8C. Accordingly, the first back plate 720 can include a plurality of third avoiding openings corresponding to the plurality of light-transmitting support columns respectively so that the base portions of the plurality of light-transmitting support columns can be clamped between the lamp panel 710 and the second back plate 730, respectively.

Generally, in the process of making the light-transmitting support column 800 with a mold, a certain draft angle is required when the product is demolded (wherein the higher the height of the light-transmitting support column is, the more obvious the draft angle will be), hence, the protrusion portion 820 in the light-transmitting support column 800 may be generally a platform (for example, from bottom to top, the area or radius of the section parallel to the bottom surface gradually decreases). For example, as shown in FIG. 8, due to the requirements of the manufacturing process when the mold is used for integrated molding, the protrusion portion 820 of the light-transmitting support column 800 is of a circular truncated cone shape, which is the shape of a cone cut off by a plane parallel to its bottom surface, the radius of its upper bottom surface being smaller than that of its lower bottom surface. However, as shown in FIG. 8B, when the light-transmitting support column 800 is assembled into the backlight module, the protrusion portion 820 of the light-transmitting support column 800 passes through the corresponding light-transmitting support column hole in the light panel 710 and extends from the first surface of the light panel 710, and the base portion 810 and the second surface of the light panel 710 are bonded together through the back glue 830. Since the protrusion portion 820 of the light-transmitting support column 800 is a platform design such as a circular truncated cone, a gap 840 will inevitably appear between its side and the light panel 710, thereby causing the backlight module to produce a dark shadow and thus affecting the display effect.

Figure 9A:
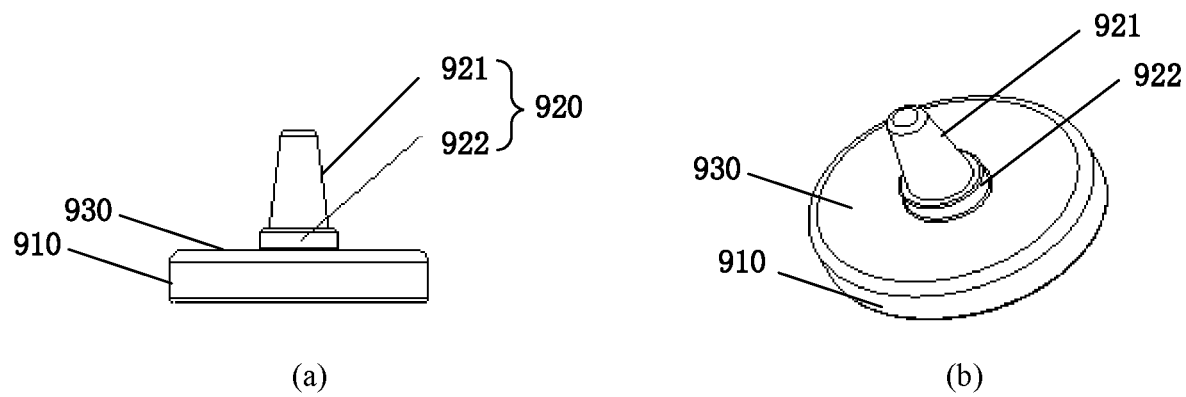
FIG. 9A is a schematic structural view of a light-transmitting support column according to some other embodiments of the present disclosure.

FIG. 9A is a schematic structural view of a light-transmitting support column 900 according to some other embodiments of the present disclosure, wherein (a) and (b) in FIG. 9A are side view and three-dimensional view of the light-transmitting support column 900 respectively. In order to eliminate the gap between the protrusion portion of the light-transmitting support column and the lamp panel, the structure of the protrusion portion of the light-transmitting support column can be improved. For example, the protrusion portion is designed as a combination of the platform and the column. As shown in FIG. 9A, the light-transmitting support column 900 may include a base portion 910, a protrusion portion 920 and a back glue 930 located on the upper surface of the base portion. The protrusion portion 920 of the light-transmitting support column 900 includes a platform portion 921 and a column portion 922, wherein the column portion 922 is located between the base portion 910 and the platform portion 921, and the lower bottom surface of the platform portion 921 is connected with the column portion 922. As shown in FIG. 9A, an area of the lower bottom surface of the platform portion 921 may be less than that of the bottom surface of the column portion 922, and the height of the platform portion 921 may be greater than that of the column portion 922. Compared to FIG. 8A, the base portion 910 and the back glue 930 of the light-transmitting support column 900 as shown in FIG. 9A are substantially the same as the base portion 810 and the back glue 830 as shown in FIG. 8A. Compared with the protrusion portion 820 shown in FIG. 8A, the protrusion portion 920 is changed from a single platform 820 shown in FIG. 8A to a platform 921 plus a column 922. In other words, compared with FIG. 8A, the light-transmitting support column 900 shown in FIG. 9A has an additional flat cylinder or disk 922 to reduce or even eliminate the gap between the side of the light-transmitting support column and the lamp panel during assembly.

In some embodiments, as shown in FIG. 9A, the platform portion 921 of the light-transmitting support column 900 can be a circular truncated cone and the column portion 822 can be a cylinder. Optionally, the platform portion 921 can also be of other platform shapes such as truncated pyramid, and the column portion 822 can also be other column shapes such as prism.

Figure 9B:
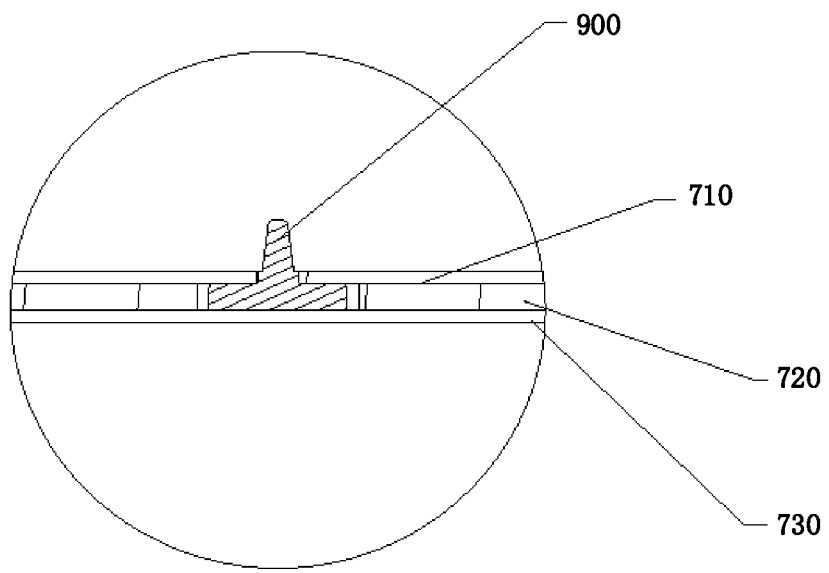
FIG. 9B is a schematic assembly view of a light-transmitting support column according to some other embodiments of the present disclosure.

FIG. 9B is a schematic assembly view of a light-transmitting support column 900 according to some other embodiments of the present disclosure. Similar as the assembly diagram shown in FIG. 8B, when the light-transmitting support column 900 shown in FIG. 9A is assembled to the backlight module, as shown in FIG. 9B, the upper surface of the base portion 910 of the light-transmitting support column 900 can be adhered or attached to the second surface (the lower surface in FIG. 9B) of the lamp panel 710 through the back glue 930, and the protrusion portion 920 can pass through the light-transmitting support column hole of the lamp panel 710 to protrude from the first surface (the upper surface in FIG. 9B) side of the lamp panel 710 to support the optical film layer. As shown in FIG. 9B, the first back plate 720 can include a third avoiding opening corresponding to the base portion 910 of the light-transmitting support column 900, so that the base portion 910 of the light-transmitting support column 900 can be clamped between the lamp panel 710 and the second back plate 730. As shown in FIG. 9B, when the assembly is completed, unlike FIG. 8B, the column portion 922 of the light-transmitting support column 900 just fills the gap between the side of the light-transmitting support column 900 (especially the protrusion portion 920) and the lamp panel 710. Different from the feature that the section size parallel to the bottom surface in the protrusion portion 820 of the single platform shape shown in FIG. 8A gradually changes from bottom to top or the side surface is inclined, the section size and shape parallel to the bottom surface in the column portion 922 shown in FIG. 9A remain unchanged, and the side surface is vertical, so that the bottom surface shape, the size or the area as well as the height of the column portion 922 can be properly designed by referring to the corresponding light-transmitting support column holes to avoid the gap between the light-transmitting support column 900 and the lamp panel 710. For example, the bottom surface of the column portion 922 of the light-transmitting support column 900 can be designed to be the same round shape as the corresponding light-transmitting-transmitting support column hole, the bottom surface diameter is slightly smaller than the diameter of the corresponding light-transmitting support column hole, and the height of the light-transmitting support column is designed to be equal to or slightly higher than the thickness of the lamp panel. Therefore, the column portion 922 shown in FIG. 9A can significantly reduce or even eliminate the gap between the light-transmitting support column and the lamp panel 710, so as to avoid the backlight module from generating black shadows and improve the display effect.

In some embodiments, as shown in FIG. 9B, the height of the column portion 922 of the light-transmitting support column 900 can be designed to be same as the thickness of the lamp panel 710. In this way, during assembly, the light-transmitting support column 900 is installed from the back side (i.e. the second surface) of the lamp panel 910 to the front side (i.e. the first surface), and the base portion 910 is attached to the second surface of the lamp panel 710 through the back glue 930. The platform portion 921 of the light-transmitting support column 900 passes through the light-transmitting support column hole of the lamp panel 710 and protrudes from the side of the first surface of the lamp panel. Since the height of the column portion 922 is the same as the thickness of the lamp panel 710, the upper surface of the column portion 922 can be basically flush with the upper surface (i.e., the first surface) of the lamp panel 710. Such an assembly structure can better fill or eliminate the gap between the lamp panel and the light-transmitting support column, and further improve the display effect.

It should be noted that the light-transmitting support column 900 shown in FIGS. 9A and 9B can also be made into an integrally formed product through a mold. Because the height of the column portion 921 is low (roughly equal to or slightly greater than the thickness of the lamp panel 710, such as less than 1 mm or less), the corresponding draft angle can be ignored. In this way, the structure of the light-transmitting support column 900 shown in FIG. 9A produced by the mold can not only eliminate the gap between it and the lamp panel 710, improve the display effect, but also ensure its own strength through the integrated molding of the mold.

Although the such double-shape design of the platform portion 921 and the column portion 922 of the protrusion portion 920 of the light-transmitting support column 900 shown in FIG. 9A can effectively reduce or fill the gap between the light-transmitting support column and the lamp panel, because the light-transmitting support column and the lamp panel are not integrally formed, it is difficult to fit the two perfectly in the assembly process. In fact, there may be some assembly gaps. Although such assembly gap may be small, it may still cause black shadow in the backlight module, especially for the backlight module with small light mixing distance. In order to eliminate or significantly reduce the assembly gap and other gaps, it can be considered to properly design the avoidance structure of the reflector attached to the upper surface of the lamp panel for the light-transmitting support column.

Figure 9C:
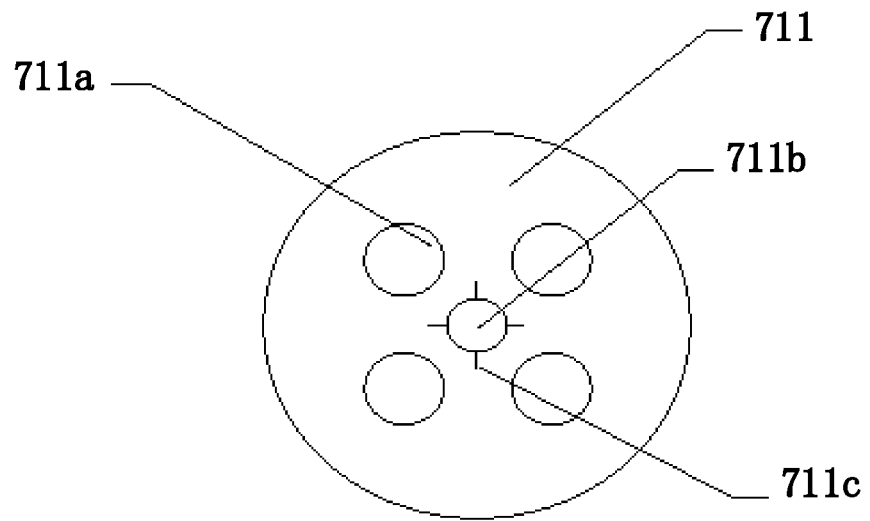
FIG. 9C is a schematic structural view of a lamp panel reflector according to some embodiments of the present disclosure.

FIG. 9C is a schematic structural view of a reflector 711 arranged on the lamp panel according to some embodiments of the present disclosure. For the assembly gap (and/or other gaps) between the light-transmitting support columns 800 and 900 and the lamp panel 710 as shown in FIGS. 8A-8B and 9A-9B, such gaps can be eliminated by designing the reflector attached to the front face (i.e. the first surface) of the lamp panel 710 as the structure shown in FIG. 9C. As shown in FIG. 9C, the reflector 711 arranged on the first surface of the lamp panel may include: (one or more) light source avoiding openings 711a corresponding to the light source array on the lamp panel, (at least one) fourth avoiding opening 711b corresponding to (one or more) light-transmitting support columns, and at least one incision 711c extending outwards from an edge of the fourth avoiding opening 711b.

As shown in FIG. 9C, the shape of the fourth avoiding opening 711b is same as that of the lower bottom surface of the protrusion portion (or the platform portion therein) of the light-transmitting support column, so that the protrusion portion or the platform portion therein of the light-transmitting support column can pass through smoothly. Moreover, the area of the fourth avoiding opening 711b is slightly smaller than that of the lower bottom surface of the protrusion portion or the platform portion therein of the light-transmitting support column. For example, as shown in FIG. 9C, the fourth avoiding opening 711b can be circular, and the diameter of the fourth avoiding opening 711b can be 10%-20% smaller than the lower bottom surface of the platform portion (or the protrusion portion) of the light-transmitting support column. For example, when the diameter of the lower bottom surface of the protrusion portion or the platform portion of the light-transmitting support column is 3.5 mm, the diameter of the fourth avoiding opening 711b can be selected from 3.15 mm to 3.85 mm. In particular, the difference between the diameter of the lower bottom surface of the protrusion portion or the platform portion of the light-transmitting support column and the diameter of the fourth avoiding opening 711b can be selected as 0.5 mm, so that the fourth avoiding opening 711b is 3 mm. In this way, when the light-transmitting support column (such as the light-transmitting support column 800 shown in FIG. 8 or the light-transmitting support column 900 shown in FIG. 9) is assembled, the protrusion portion or the platform portion thereof can open the incision 711c and pass through the corresponding fourth avoiding opening 711b, so that the side surface (of the protrusion portion or the platform portion therein) of the light-transmitting support column is closely fitted with the reflector 711, so that various gaps, such as assembly gaps, between the light-transmitting support column and the lamp panel can be covered, so as to eliminate the shadow caused by these gaps and fully improve the display effect.

In some embodiments, as shown in FIG. 9C, in the reflector 711, there may be a plurality of incisions 711c around the fourth avoiding opening 711b, and the lengths of the plurality of incisions 711c can be the same, so that when the light-transmitting support column is assembled, the side surface of its protrusion portion or the platform portion therein can fit with the reflector 711 in all directions to avoid additional gaps caused by inconsistent incision lengths. In some embodiments, the plurality of incisions 711c around the fourth avoiding opening 711b on the reflector 711 can be uniformly distributed around the avoiding opening 711b to further promote the tightness of the side of the light-transmitting support column and the reflector 711. As shown in FIG. 9C, one fourth avoiding opening 711b can correspond to four incisions 711c, forming cross incisions in four directions, such as up, down, left and right, around the fourth avoiding opening 711b. In this way, during assembly, since the area of the fourth avoiding opening 711b of the reflector 711 is slightly smaller than the area of the bottom surface of the protrusion portion or its platform portion of the light-transmitting support column (for example, when both are circular, the radius of the opening 711b is slightly smaller than the bottom radius of the platform portion of the light-transmitting support column), the protrusion portion (or the platform portion therein) of the light supporting column will evenly open the cross incisions 711b during assembly, so that the reflector 711 and the side surface of the light-transmitting support column will be closely and seamlessly fitted.

In some embodiments, the color of the reflector 711 can be designed to be same as that of the light-transmitting support column or the protrusion portion (or the platform portion) thereof. Generally, the color of the light-transmitting support column can be adjusted to be close to or the same as the color of the reflector to make its reflectivity close to or consistent with the reflectivity of the reflector, so as to enhance the light mixing effect, thereby improving the backlight effect and display effect. Optionally, the experiment shows that the color of the light-transmitting support column or its protrusion portion can be set to white to make the backlight module achieve the best backlight effect, so that the corresponding display can obtain the best display effect.

Figure 10:
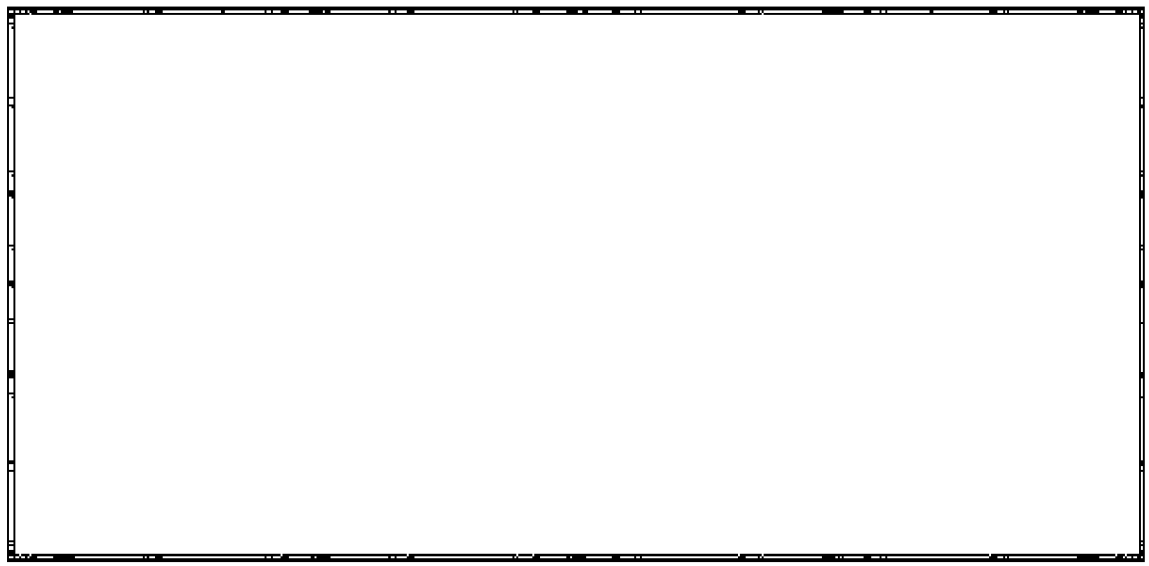
FIG. 10 is a schematic view of a film layer frame according to some embodiments of the present disclosure.

FIG. 10 is a schematic view of a film layer frame 1000 according to some embodiments of the present disclosure. As shown, the film layer frame 1000 is a rectangular frame. Optionally, the shape of the film layer frame 1000 can be determined according to actual requirements, for example, it can be determined to be circular, oval, etc. in accordance with the lamp panel or the first back panel. Therefore, the film layer frame 1000 can be configured to support the edge of the optical film layer, such as the edge of the light transmission film layer 740 schematically shown in FIG. 7.

Figure 11:
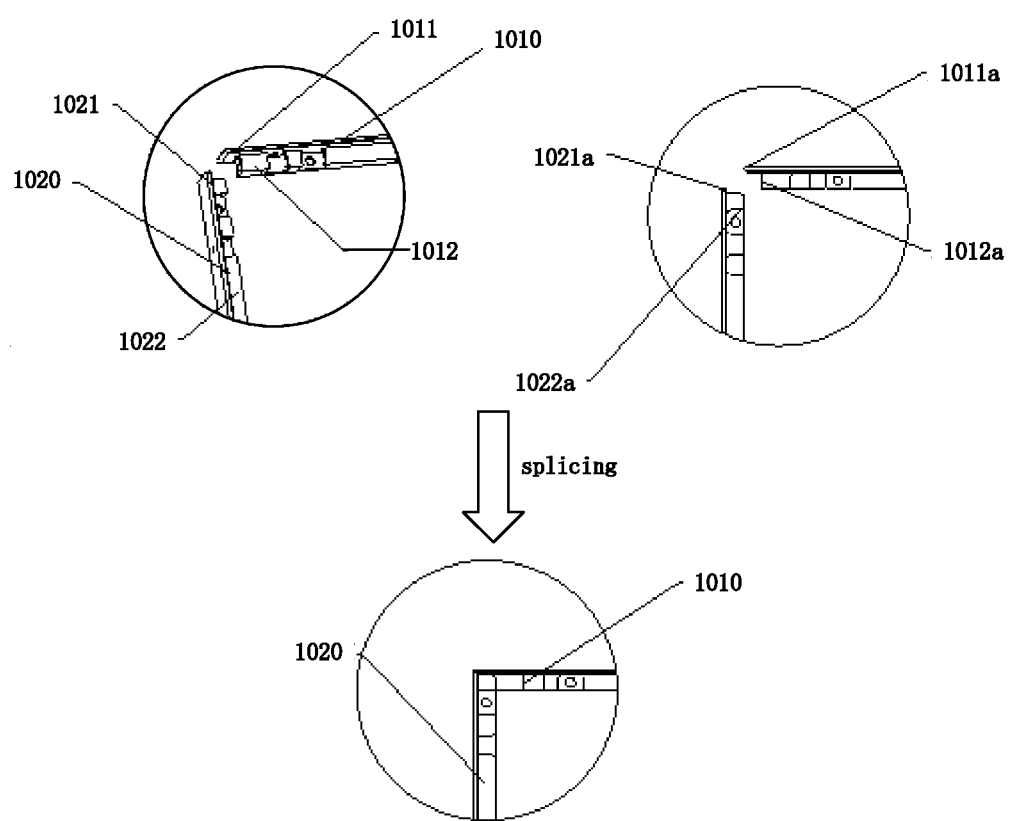
FIG. 11 is a schematic view showing splicing of adjacent side frames according to some embodiments of the present disclosure.
Figure 12A:
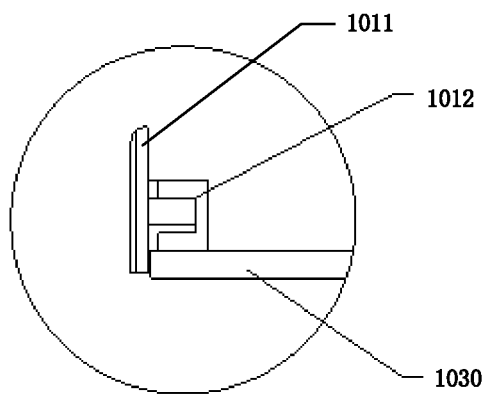
FIGS. 12A-12C are schematic views showing an engaging process of the side frame and the first back plate according to some embodiments of the present disclosure.
Figure 12B:
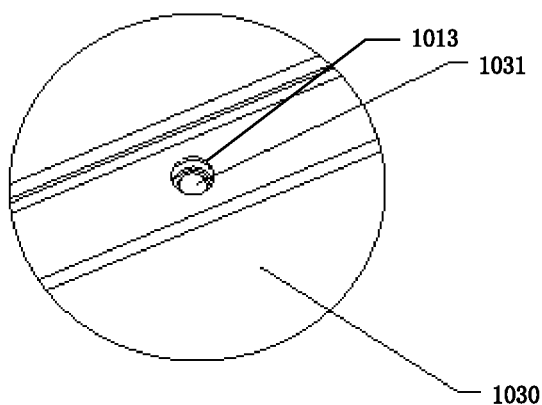
Figure 12C:
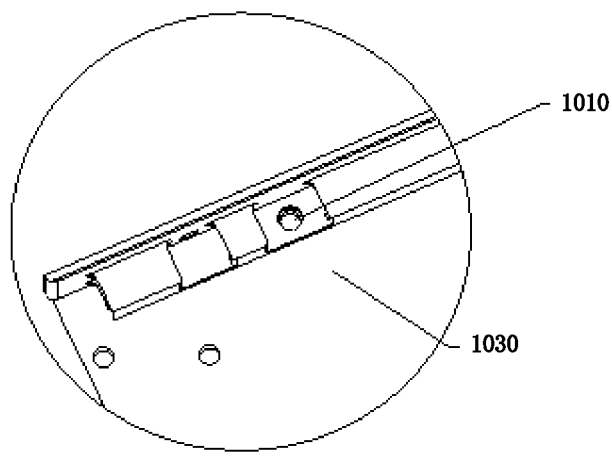

In some embodiments, the film layer frame 1000 may be an integrally manufactured frame, or it may be formed by splicing a plurality of side frames. As shown in FIG. 11, the film layer frame 1000 may include a first side frame 1010. For example, the first side frame 1010 may include a side frame portion 1011 and a support platform 1012. The support platform 1012 may include a first supporting surface and a second supporting surface opposite to each other. As shown in FIG. 12A, the first supporting surface of the support platform may be engaged with the first back plate 1030, and the second supporting surface may be configured to support an optical film layer, such as the optical film layer 740 schematically shown in FIG. 7. As shown in FIG. 11, the film layer frame 1000 can further include a second film frame 1020 connected with the first side frame by splicing. The second side frame 1020 can have a similar structure as the first side frame. As shown in FIG. 11, the second side frame 1020 can include a side frame portion 1021 and a support platform 1022. Optionally, the second side frame 1020 can also have a structure different from the first side frame, as long as the two can be sliced. As shown in FIG. 12A, each of the first side frame 1010 and the second side frame 1020 may have a hollow square-shaped cross section, which helps to provide a better supporting effect with less material. For example, the first side frame 1010 and/or the second side frame 1020 may be made of aluminum or other materials, for example, it may be made of aluminum by extrusion molding or stretch molding.

In some embodiments, as shown in FIG. 11, the film layer frame 1000 may be a rectangular frame formed by splicing two first side frames 1010 and two second side frames 1020. Optionally, the film layer frame 1000 can also not use the four side frames spliced to form a closed rectangular frame structure, but can only include two opposite side frames to support the optical film layer, for example, only include two opposite first side frames 1010 or two opposite second side frames 1020 in the rectangular frame.

Continuing with reference to FIG. 11, it schematically shows a splicing process of adjacent side frames according to some embodiments of the present disclosure. As shown in FIG. 11, at the splicing position of the first side frame 1010 and the second side frame 1020, the lengths of the side frame portion 1011 and the support platform 1012 of the first side frame 1010 may be different. For example, the side frame portion 1011 may be longer than the support platform 1012, and the length difference between them may be equivalent to the width of the support platform 1022 of the second side frame 1020, namely the length of the support platform 1022 extending from an inner surface of the side frame portion 1021. The lengths of the side frame portion 1021 and the support platform 1022 of the second side frame 1020 may be different. For example, the side frame portion 1021 may be longer than the support platform 1022, and the length difference between them may be equivalent to the thickness of the side frame portion 1011 of the first side frame 1010, namely the distance between the outer surface and the inner surface of the side frame portion 1021. Therefore, when the first side frame portion 1010 and the second side frame portion 1020 are spliced together, the protruding portion of the side frame portion 1011 of the first side frame 1010 relative to the support platform 1012 can be at least partially accommodated in the breach formed by the side frame portion 1021 and the support platform 1022 of the second side frame 1020, and the support platform 1022 of the second side frame 1020 can be at least partially accommodated in the breach between the side frame portion 1011 and the support platform 1012 of the first side frame 1010.

Optionally, in order to ensure the integrity and splicing convenience of the frame formed by splicing the first side frame 1010 and the second side frame 1020, a zero splicing gap can be defined between an end face 1011a of the side frame portion 1011 of the first side frame 1010 and an inner surface 1021a of the side frame portion 1021 of the second side frame 1020. However, a splicing gap larger than 0, such as 0.2 mm or smaller or larger, is defined between an end face 1012a of the support platform 1012 of the first side frame 1010 and a side surface 1022a of the support platform 1022 of the second side frame 1020.

After the first side frame 1010 is spliced with the second side frame 1020, they can be spliced with other side frames in a similar way, and finally the film layer frame 1000 as shown in FIG. 10 is obtained by splicing. Meanwhile, each side frame can be fixedly connected with the first back plate respectively. As mentioned above, the first supporting surface of the support platform of each side frame can be engaged with the first back plate, as shown in FIG. 11A. For example, as shown in FIG. 11A, the lower supporting surface of the support platform 1012 of the first side frame 1010 can be engaged with the first back plate 1030. And, optionally, the side frame portion 1011 of the first side frame 1010 may extend beyond the second supporting surface (the lower surface shown in FIG. 11A) of the support platform 1012, thereby limiting the locating of the first back plate 1030. In addition, optionally, the first back plate 1030 can be located by locating pins. For example, as shown in FIG. 11B, the edge of the first back plate 1030 may have one or more locating pins 1031, and the support platform 1012 of the first side frame 1010 may be provided with one or more locating holes 1013 at corresponding positions. When the first side frame 1010 is engaged with the first back plate 1030, each locating pin 1031 can pass through the corresponding locating hole 1013 to realize the locating between the first side frame 1010 and the first back plate 1030. Optionally, as shown in FIG. 11C, the first side frame 1010 can be locked and fixed with the first back plate 1030 by screws, or the two can be fixed together by other means such as riveting, gluing, etc. The second side frame 1020 and possibly other side frames can be similarly engaged with the first back plate 1030.

In some embodiments, at least one of the first side frame and the second side frame may further include at least one film layer hanging lug, which is arranged on the support platform and protrudes from the second supporting surface in a direction towards the optical film layer. The optical film layer may include at least one hanging hole corresponding to the at least one film layer hanging lug, and the at least one hanging hole may be sleeved on the corresponding film layer hanging lug to locate the optical film layer. Therefore, on the one hand, the optical film layer can be located relative to the film layer frame, and on the other hand, the optical film layer can be fixed, so as to avoid its displacement or wrinkles, thereby also contributing to the improvement of the optical processing effect, and further facilitating the display device to achieve a better display effect.

Figure 13A:
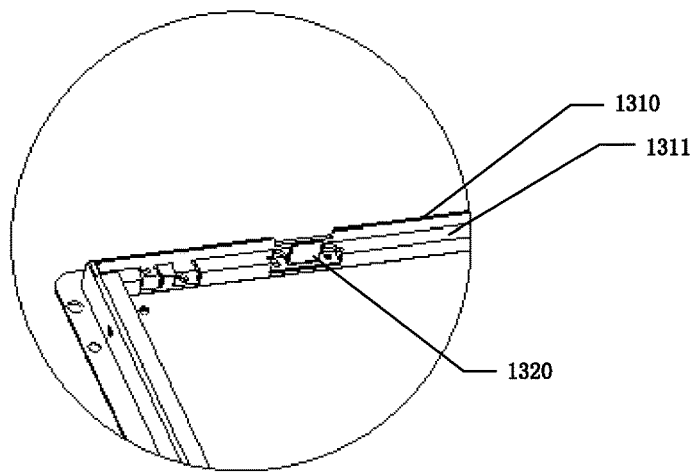
FIGS. 13A-13B are schematic structural views of a film layer hanging lug according to some embodiments of the present disclosure.
Figure 13B:
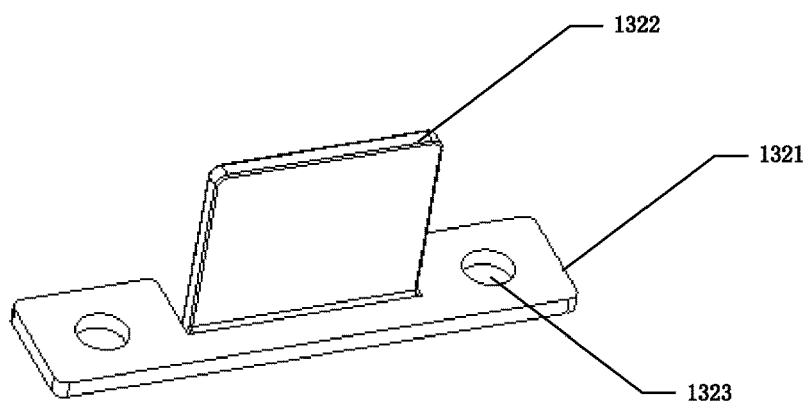

For example, as shown in FIG. 13A, one side frame 1310 of the film layer frame in the backlight module 1300 may include at least one film layer hanging lug 1320, the detail of which is shown in FIG. 13B. As shown in FIG. 13B, the film layer hanging lug 1320 may have a base portion 1321 and an erection portion 1322 extending upward from one surface of the base portion, and the base portion 1321 may have at least one mounting hole 1323. When the film layer hanging lug 1320 is mounted on the side frame 1310, its erection portion 1322 can be configured to hook a corresponding opening on the optical film layer, thus playing a role in locating and fixing the optical film layer. Optionally, the film layer hanging lug can also have other suitable shapes, as long as there is a structure that can hook the corresponding opening on the optical film layer.

For example, as shown in FIG. 13A, there may be a notch in the support platform 1311 of the side frame 1310 for locating and accommodating the film layer hanging lug, so that the film layer hanging lug 1320 can be placed in the corresponding notch of the side frame 1310. In addition, when the side frame 1310 is a frame strip with the aforementioned hollow square-shaped cross section, the base portion of the film layer hanging lug 1320 can be engaged with an inner side surface of a side of the hollow square-shaped structure close to the first back plate. Optionally, the film layer hanging lug 1320 can be locked at a corresponding position of the side frame 1310 by screwing. In addition, optionally, the film layer hanging lug 1320 can also be fixedly connected with the side frame 1310 by other ways, such as riveting, gluing, etc. In addition, the film layer hanging lug 1320 can also be fixedly connected to other positions of the side frame 1310, such as the second supporting surface of the support platform 1311.

For example, any number of film layer hanging lugs can be provided at any position of the film layer frame according to actual requirements. For example, five or other numbers of film layer hanging lugs can be uniformly distributed on two opposite side frames of the film layer frame. Alternatively, a plurality of film layer hanging lugs can be uniformly distributed on the four side frames of the film layer frame respectively.

Figure 14:
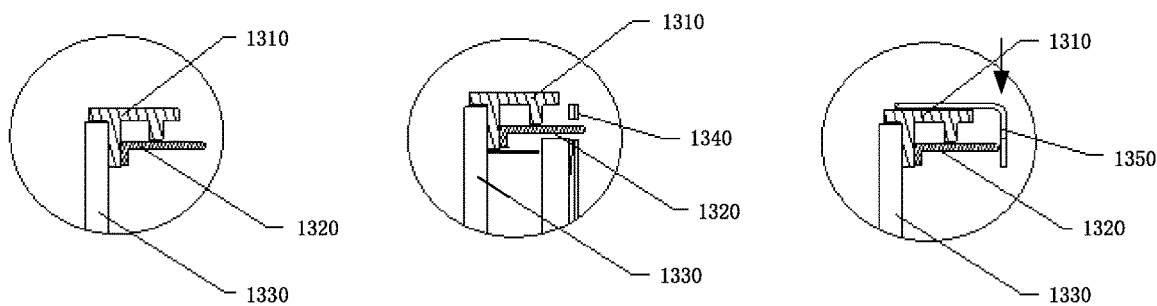
FIG. 14 is a schematic view showing an installation process of a film layer hanging lug according to some embodiments of the present disclosure.

FIG. 14 schematically shows an example mounting process of a film layer hanging lug according to some embodiments of the present disclosure. As shown in the left side view of FIG. 14, the first back plate 1330 can be fixedly connected at the first supporting surface of the support platform of the side frame 1310, that is, at the outer side surface of the left side of the "hollow square shaped" cross section shown in the figure, and the film layer hanging lug 1320 can be fixed at the inner side surface of the left side of the "hollow square shaped" cross section. Then, as shown in the middle view of FIG. 14, the optical film layer 1340 can be placed on the support platform of the side frame 1310 and sleeved on the film layer hanging lugs 1320 through openings. Optionally, the optical film layer 1340 may include a diffusion plate and an optical film which are attached together, wherein the diffusion plate may define a position-avoiding notch at a position corresponding to the film layer hanging lug, and the optical film may form a hanging opening at a position corresponding to the film layer hanging lug so as to be sleeved on the film layer hanging lug.

In some embodiments, at least one film layer pressing sheet may be provided on at least one of the first side frame and the second side frame. The film layer pressing sheet may include a first extension, a second extension, and a bent portion between the first extension and the second extension. The first extension may be engaged with the side frame portion, and the second extension may be pressed against the optical film layer. For example, as shown in the right side view of FIG. 14, the side frame portion 1310 may be provided with a film layer pressing sheet 1350, which includes two extensions and a bent portion between the two extensions. The first extension of the two extensions of the film layer pressing sheet 1350 may be engaged with the outer side surface of the side frame portion of the side frame 1310 as shown in the figure, and optionally, it may be fixedly connected to the surface by gluing, screwing, riveting and other appropriate means. Alternatively, the first extension may be engaged with and fixedly connected to the inner side surface of the side frame portion of the side frame 1310. The second extension of the two extensions may be approximately perpendicular to the first extension and extend beyond the film layer hanging lug 1350 to press against the optical film layer hanging on the film layer hanging lug 1350, so as to limit it in a direction perpendicular to the optical film layer and prevent it from accidentally falling off. Optionally, the second extension of the film layer pressing sheet may be in contact with the optical film layer, or may be spaced apart from it. Optionally, one or more film layer pressing sheets may extend along part or all of each side frame.

Figure 15:
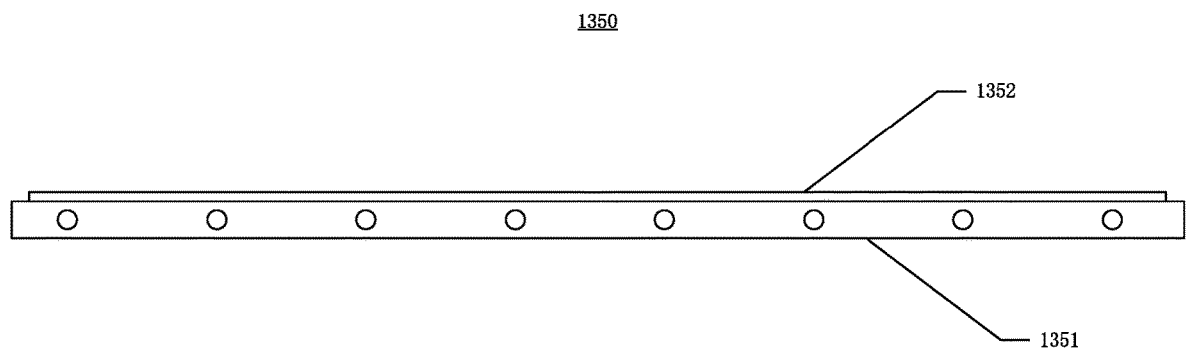
FIG. 15 is a schematic view of a film layer pressing sheet according to some embodiments of the present disclosure.

Schematically, FIG. 15 is a schematic view of a film layer pressing sheet 1350 according to some embodiments of the present disclosure. The view shown in FIG. 15 may be a view of the film layer pressing sheet 1350 in the left side view of FIG. 14 in a direction of an arrow, in which 1351 may indicate the first extension of the film layer pressing sheet 1350, which is engaged to the side frame portion of the side frame 1310. Optionally, the first extension may include a screw hole or a through hole for fixing to the side frame portion. 1352 can indicate a bent portion of the film layer pressing sheet 1350, which is bent in a direction towards the film layer hanging lug or the optical film layer, so that the second extension of the film layer pressing sheet 1350 can be pressed against the optical film layer.

In some embodiments, at least one of the first side frame and the second side frame may further include a yellow reflective strip. The yellow reflective strip can cover the side surface of the support platform. And, optionally, the yellow reflective strip can also cover at least a part of the second supporting surface of the support platform. Optionally, the yellow reflective strip can be fixed at a corresponding position of the support platform by gluing. Locating the yellow reflective strip on a side of the support platform of the side frame is helpful to improve the optical effect at the corresponding edge and to avoid or alleviate a black edge phenomenon of the display device. The yellow reflective strip also covers at least a part of the second supporting surface of the support platform, which helps to fix the yellow reflective strip better and avoid or alleviate possible problems such as edge warping and falling off. Optionally, yellow reflective strips can be arranged on all sides of the support platform of each side frame to improve the optical effect of all edge areas more perfectly.

Figure 16A:
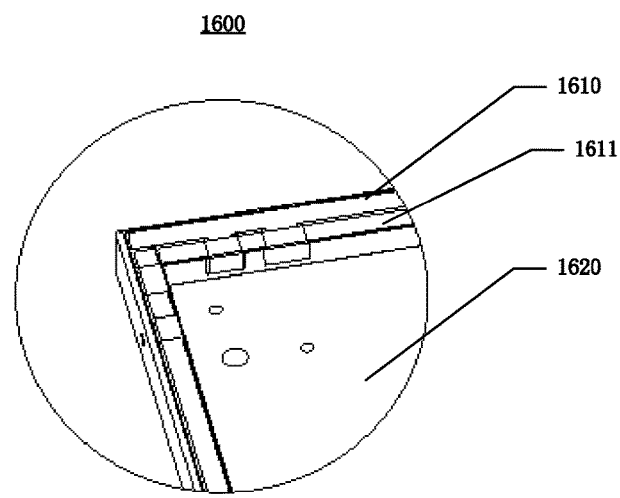
FIGS. 16A-16B are schematic views showing installation details of a yellow reflective strip according to some embodiments of the present disclosure.
Figure 16B:
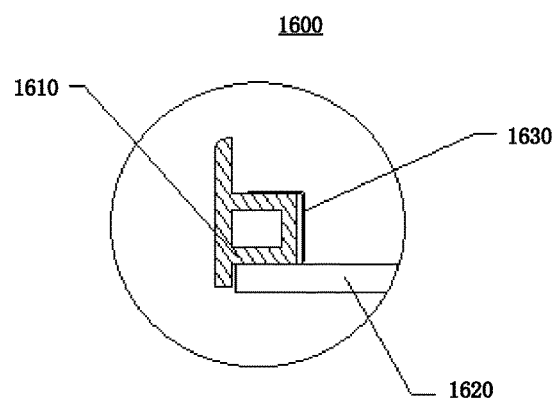

For example, FIGS. 16A-16B are schematic installation views of the yellow reflective strip according to some embodiments of the present disclosure. As shown in FIG. 16A, the yellow reflective strip can be attached to a side of the support platform 1611 of the side frame 1610 and optionally at least a part of the second supporting surface (i.e., the supporting surface away from the first back plate 1620). FIG. 16B further illustrates a cross-sectional view of the side frame 1610 in FIG. 16A, in which the first supporting surface of the support platform of the side frame 1610 is engaged with the first back plate 1620, and its side surface and a part of the second supporting surface of the side frame 1610 are covered with the yellow reflective strip 1630. For example, the yellow reflective strip 1630 can be arranged on the side frame 1610 through the following process. First, a right-angle bend can be made on the yellow reflective strip 1630, and then one right-angle edge of the right-angle bend can be attached to the second supporting surface of the side frame 1610. Optionally, this part can be pressed by an optical film layer provided on the second supporting surface, and the other right-angle edge can be attached to the side surface of the side frame 1610 to improve the optical effect at the edge by reflecting light.

Figure 17:
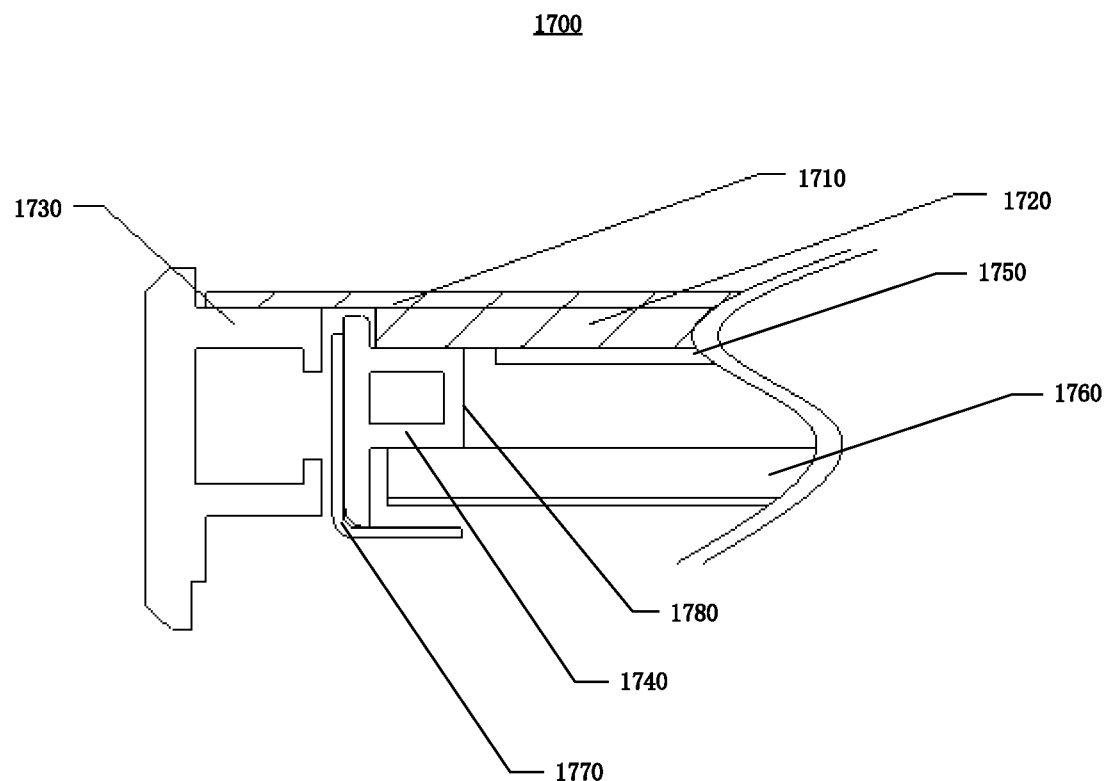
FIG. 17 is a schematic cross-sectional view of a backlight module according to some embodiments of the present disclosure.

FIG. 17 is a schematic cross-sectional view of a backlight module 1700 according to some embodiments of the present disclosure. As shown in FIG. 17, the backlight module 1700 may include a second back plate 1710 and a first back plate 1720, wherein an edge of the second back plate 1710 extends beyond the first back plate 1720, thereby lapping the overall machine frame 1730 of the display device. The first back plate 1720 may be lapped on the first supporting surface of the support platform of the film layer frame 1740, and a side of the first back plate 1720 away from the second back plate 1710 may be engaged with a lamp panel 1750. The lamp panel 1750 has a light source array on a side facing away from the first back plate 1720, and a light source array driving circuit and external terminals on a side facing the first back plate 1720. An optical film layer 1760 may be placed on the second supporting surface of the support platform of the film layer frame 1740. Optionally, the optical film layer can be located and fixed by the film layer hanging lug provided on the support platform, and can be supported by providing a light-transmitting support column protruding from the lamp panel. For the sake of brevity, the film layer hanging lug and light-transmitting support column are not shown in FIG. 17. In addition, the film layer frame 1740 may be provided with a bent film layer pressing sheet 1770 to fix the optical film layer 1760 in a direction perpendicular to the optical film layer 1760. A yellow reflective strip 1780 can also be provided on a side of the support platform of the film layer frame 1740 to improve the optical effect at the edge.

Figure 18:
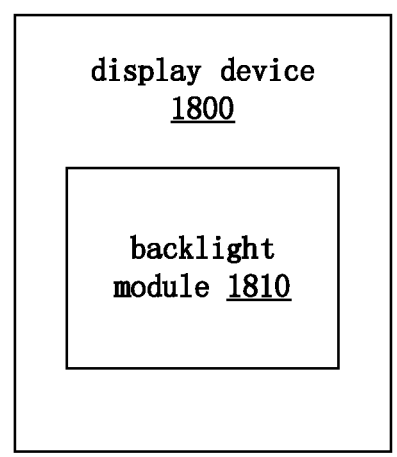
FIG. 18 is a schematic block diagram of a display device according to some embodiments of the present disclosure.

In some embodiments, the backlight module described with reference to the aforementioned figures and various embodiments can be used for display devices. For example, the aforementioned backlight module can be used in a display device such as a liquid crystal display to provide backlight to illuminate a display structure such as a liquid crystal panel in order to present a desired display effect. By way of example, FIG. 18 schematically illustrates a block diagram of a display device 1800 according to some embodiments of the present disclosure, which includes a backlight module 1810. The backlight module 1810 may have various features described according to the foregoing various embodiments. In some embodiments, the display device may include an overall machine frame, wherein at least a part of the edge of the second back plate of the backlight module may be connected with the overall machine frame. For example, the edge of the second back plate of the backlight module can be directly fixed on the overall machine frame by screwing, gluing, riveting and other ways, or it can also be fixed on the overall machine frame by an intermediate element. For example, as shown in FIG. 17, the edge of the second back plate 1710 may extend beyond the first back plate 1720, so as to be lapped and fixed on the overall machine frame 1730 of the display device. By fixing the second back plate to the overall machine frame, the backlight module can be fixed in the display device.

In the embodiment where the backlight module is designed to be applied to the device such as the above display device, the backlight module can be connected to other components such as power supply, control board, etc. of the display device through the above external terminals. Furthermore, in the embodiment where the backlight module includes a plurality of sub lamp panels, each sub lamp panel can also be connected with other sub lamp panels through the aforementioned external terminals.

In some embodiments, in order to facilitate the connection between the backlight module and other components and the connection between the sub lamp panels inside the backlight module, the aforementioned external terminals can include a plurality of terminal units, and each terminal unit can include a first terminal and a second terminal. The interface of the first terminal can be located on a side of the first terminal away from the second terminal, and the interface of the second terminal can be located on a side of the second terminal away from the first terminal. For example, the first terminal and the second terminal can be data terminals connected to the same light source array driving circuit, for example, for connecting the backlight module to the control board or realizing the connection between the sub lamp panels in the backlight module. For example, each terminal unit may further include a third terminal, which may be a power supply terminal, for example, for connecting the backlight module to the power supply. Optionally, the first and second terminals can also be power supply terminals, and the third terminal can also be a data terminal.

Figure 19A:
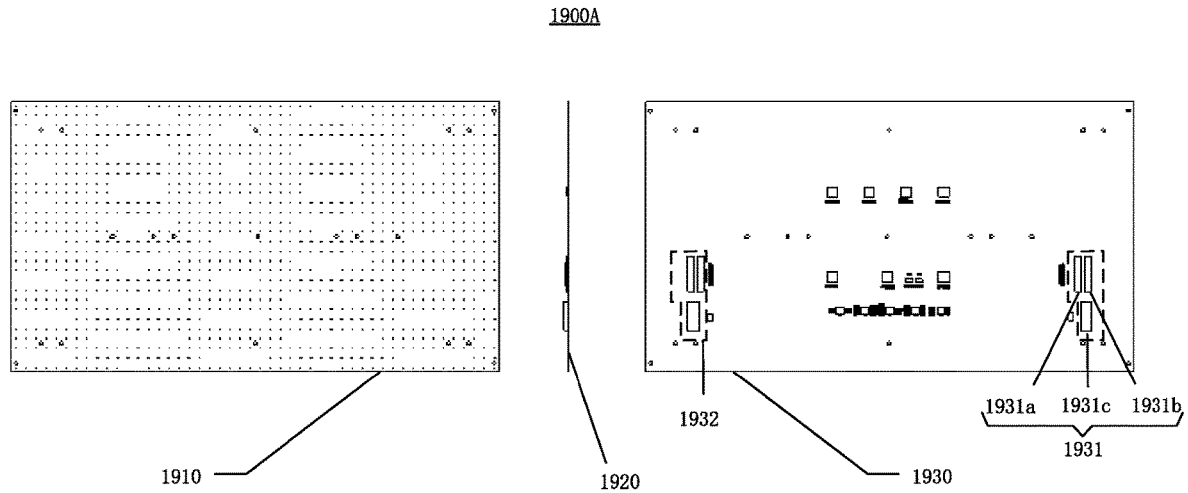
FIG. 19A is a schematic view of a sub lamp panel according to some embodiments of the present disclosure.

For example, FIG. 19A is the schematic view of a sub lamp panel 1900A according to some embodiments of the present disclosure, showing the front view 1910, the side view 1920 and the back view 1930 of the sub lamp panel 1900A, respectively. As shown in the front view 1910 and the back view 1930 and as described above, a light source array such as a LED array or miniLED array can be arranged on the front surface (i.e. the first surface) of the sub lamp panel 1900A, and the light source array driving circuit and the external terminals, such as connectors, chips and other devices can be arranged on the back surface (i.e. the second surface) of the sub lamp panel 1900A. As shown in the side view 1920, the light source array driving circuit and the external terminals may have a certain height. It should be understood that the positions of devices such as connectors on the back of the sub lamp panel 1900A can be determined by combining other components in the display device (such as a touch film).

For example, as shown in FIG. 19A, in the back view 1930 of the sub lamp panel 1900A, the sub lamp panel 1900A may include two terminal units 1931, 1932, which are respectively arranged along the two opposite side edges of the sub lamp panel 1900A in the third direction (transverse direction in the figure). As shown in FIG. 19A, the two terminal units 1931, 1932 can be symmetrically arranged near the left and right edges on the back of the sub lamp panel 1900A. The two terminal units 1931 and 1932 can be terminal units with the same structure and/or function. As shown in FIG. 19A, the terminal unit 1931 can include a first terminal 1931a and a second terminal 1931b, and optionally can include a third terminal 1931c. The first terminal 1931a and the second terminal 1931b can have interfaces deviating from each other (i.e., back-to-back), that is, the first terminal 1931a is connected (e.g., welded) on the sub lamp panel 1900A on the right side, and its interface is located on the left side, the second terminal 1931b is connected (e.g., welded) on the sub lamp panel 1900A on the left side, and its interface is located on the right side. Optionally, the structure and function of the first terminal 1931a and the second terminal 1931b can be identical, and can be directly or indirectly connected together. For example, the first terminal 1931a and the second terminal 1931b can be data terminals connected to the same light source array driving circuit in the sub lamp panel 1900A, that is, they can be used separately for the connection between the light source array driving circuit of the sub lamp panel 1900A and the external equipment, such as the backlight control board or the light source array driving circuit of other sub lamp panels. It should be understood that the relative concepts of front and back, left and right mentioned above are only for the convenience of description, not for the purpose of specific limitation. It should also be understood that the backlight module can include one or more sub lamp panels 1900A as shown in FIG. 19A. When the backlight module includes only one sub lamp panel 1900A, the sub lamp panel can also be regarded as the lamp panel described previously.

With the terminal unit described in the above embodiment, the external and internal connections of the backlight module can be easily realized. More specifically, through the combination of the first terminal and the second terminal with the interfaces deviating from each other, it is allowed to select the interfaces of the first terminal or the second terminal for connection according to the needs, thus helping to achieve a more flexible wiring mode.

Figure 19B:
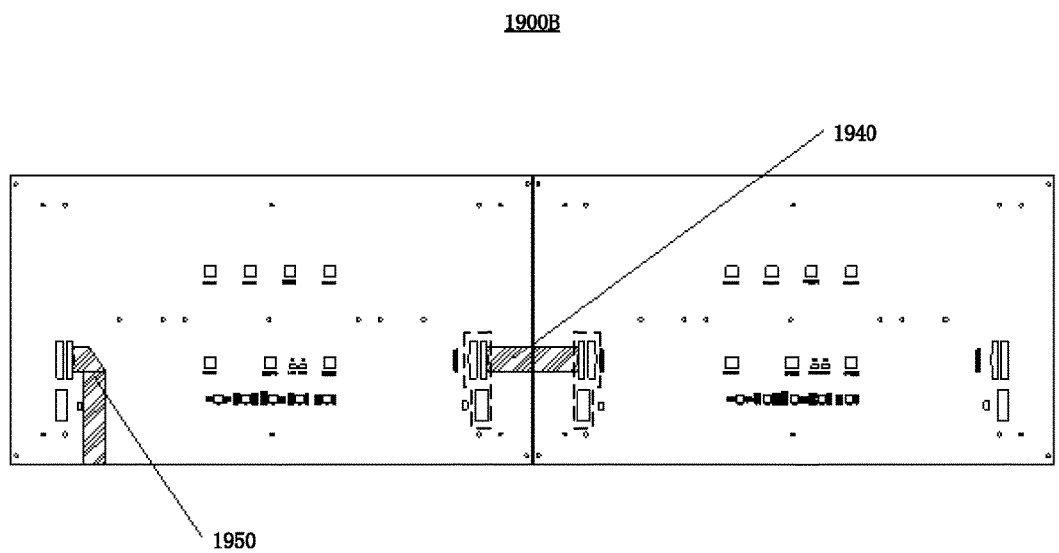
FIG. 19B is a schematic view of connection of terminal units according to some embodiments of the present disclosure.

FIG. 19B shows the connection diagram 1900B of terminal units between two sub lamp panel units spliced together according to some embodiments of the present disclosure. FIG. 19B shows two sub lamp panels, wherein each sub lamp panel can be the sub lamp panel 1900A as shown in FIG. 19A and include the terminal unit 1931 as shown in FIG. 19A. As indicated by reference numeral 1940, the connection between two sub lamp panels can be made through two terminals. That is, for the terminal unit of the left side sub lamp panel adjacent to the right side sub lamp panel, the terminal, of which the interface faces the right side sub lamp panel, in the first terminal and the second terminal set as back-to-back can be used; at the same time, for the terminal unit of the right side sub lamp panel adjacent to the left side sub lamp panel, the terminal, of which the interface faces the left side sub lamp panel, in the first terminal and the second terminal set as back-to-back can be used. In addition, as indicated by the reference numeral 1950, the left side sub lamp panel can be connected with other components below, such as the control board. When the terminal unit is close to the edge of the lamp panel, for example, when the distance is less than the width of the connecting line or is only slightly wider than the width of the connecting line such that it is not convenient for wiring, the terminal closer to the inside of the light panel can be selected for connection, which is exactly the case indicated by the reference numeral 1950. Optionally, when the terminal unit is far from the edge of the lamp panel, the terminal closer to the outside of the lamp panel can also be used for connection. It can be seen from FIG. 19B that the terminal unit shown in FIG. 19A (especially the first terminal 1031a and the second terminal 1031b whose interfaces deviate from each other) can provide more diversified choices for the wiring of the connecting lines, help to increase the flexibility of wiring, and facilitate the assembly of the sub lamp panel and backlight module.

In some embodiments, the lamp panel can include two sub lamp panels spliced in mirror image mode, and these two sub lamp panels spliced in mirror image mode are the same sub lamp panel. The "same" here can be understood as that the two sub lamp panels are identical, or they are at least identical in shape, size and arrangement of various elements in the lamp panel (for example, see the two sub lamp panels in FIG. 19B). The mirror image mode can be understood as that various components (such as light source array drive circuit, external terminal, etc.) on the second side of the two sub lamp panels are axially symmetric with respect to the splicing line (for example, see the two sub lamp panels in FIG. 19B).

In some embodiments, the lamp panel can include at least one lamp panel unit, each lamp panel unit can include a plurality of sub lamp panels, each sub lamp panel can include two terminal units, and the two terminal units can be respectively arranged along two opposite side edges of the sub lamp panel in the third direction, and any two adjacent sub lamp panels can be arranged in a mirror image. For example, according to the actual application requirements, the light panel can include two, three, four or more lamp panel units, and each lamp panel unit can include two, three, four, six, eight, ten or more sub lamp panels. For example, for an 86 inch lamp panel, it can include two lamp panel units, and each lamp panel unit can include eight sub lamp panels. Optionally, the related circuits of the sub lamp panels in the same lamp panel unit can be connected together, such as in series. For example, in such a lamp panel unit, sub lamp panels can be connected together with reference to the connection method described in FIG. 19B. As shown in FIG. 19B, in the lamp panel unit, any two adjacent sub lamp panels in the third direction (such as the transverse direction in FIG. 19B) of a plurality of sub lamp panels are connected by adjacent terminal units.

Figure 20:
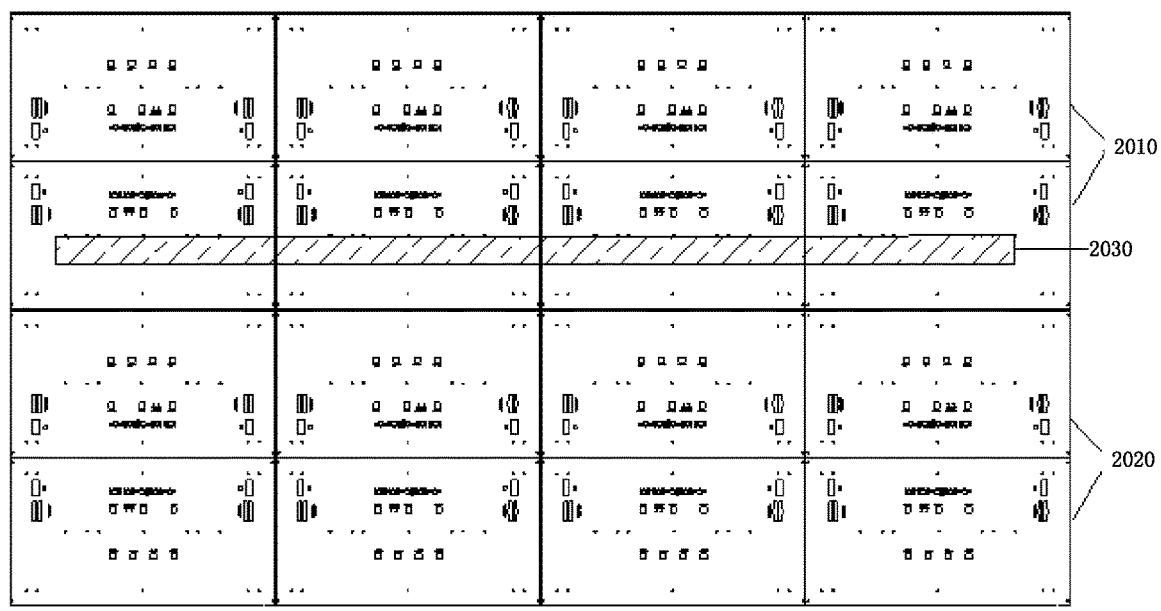
FIG. 20 is a schematic structural view of a lamp panel according to some embodiments of the present disclosure.

For example, FIG. 20 is the schematic structural view of the lamp panel 2000 according to some embodiments of the present disclosure. The lamp panel 2000 in FIG. 20 includes two lamp panel units, namely the upper lamp panel unit 2010 and the lower lamp panel unit 2020. The lamp panel unit 2010 and the lamp panel unit 2020 respectively include 8 sub lamp panels, which are arranged in two rows, with 4 sub lamp panels in each row. As shown in FIG. 20, each sub lamp panel is spliced together in a mirror image way, that is, the terminal units of two adjacent sub lamp panels are arranged in a mirror image. This arrangement allows the terminal units to be closer together, making it easier to connect the sub lamp panels. At the same time, this arrangement enables the corresponding avoiding openings in the back plate of the backlight module to be relatively centralized, thus contributing to the tidiness of the overall wiring and the aesthetics after assembly. In addition, in order to further improve the strength of the assembled backlight module, the terminal unit of the lamp panel unit 2010 on the upper side can be arranged at a more upward position, so that the installation position of the transverse reinforcing rib can be as upward as possible, so as to enhance the strength of the spliced lamp panel unit 2010. Reference numeral 2030 schematically shows the possible installation position of the transverse reinforcing rib. It should be understood that this position is only schematic. In fact, as described above, the reinforcing rib can be installed on a side of the second back plate away from the first back plate and the lamp panel. In addition, vertical reinforcing ribs can be set at the position perpendicular to the transverse reinforcing rib position 2030 to further enhance the assembly strength.

In some embodiments, the backlight module can be assembled with a touch component to provide a touch screen. Optionally, the touch component can include a capacitive touch component, an electromagnetic touch component, etc.

Figure 21A:
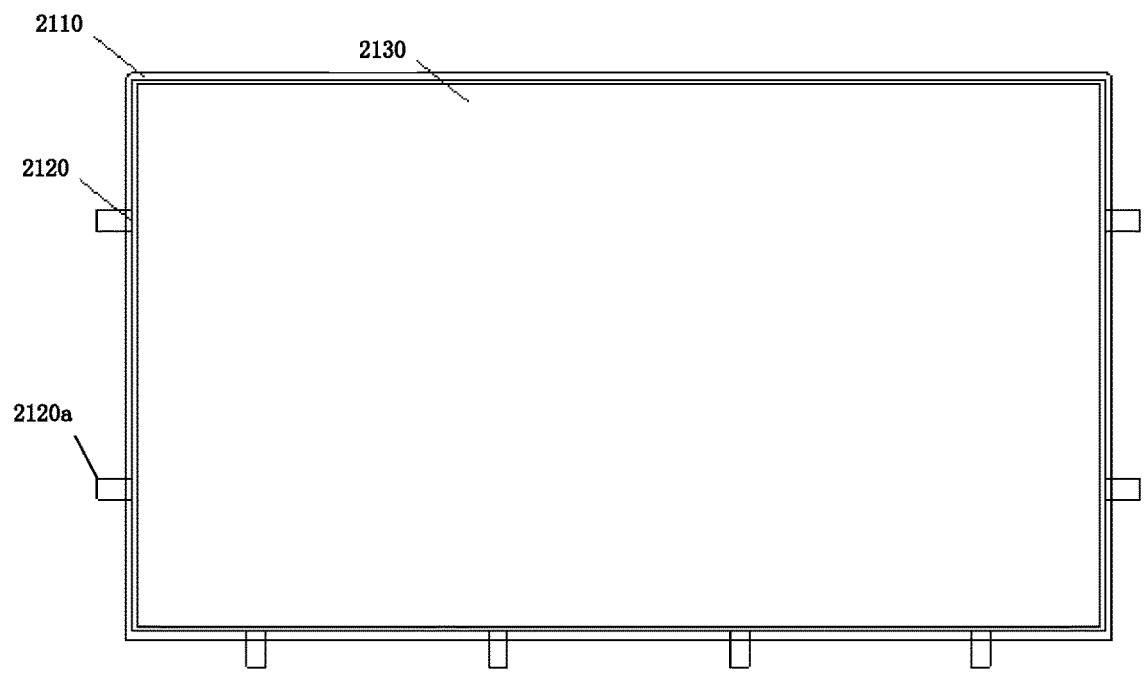
FIGS. 21A-21B are schematic block diagrams of touch components according to some embodiments of the present disclosure.
Figure 21B:
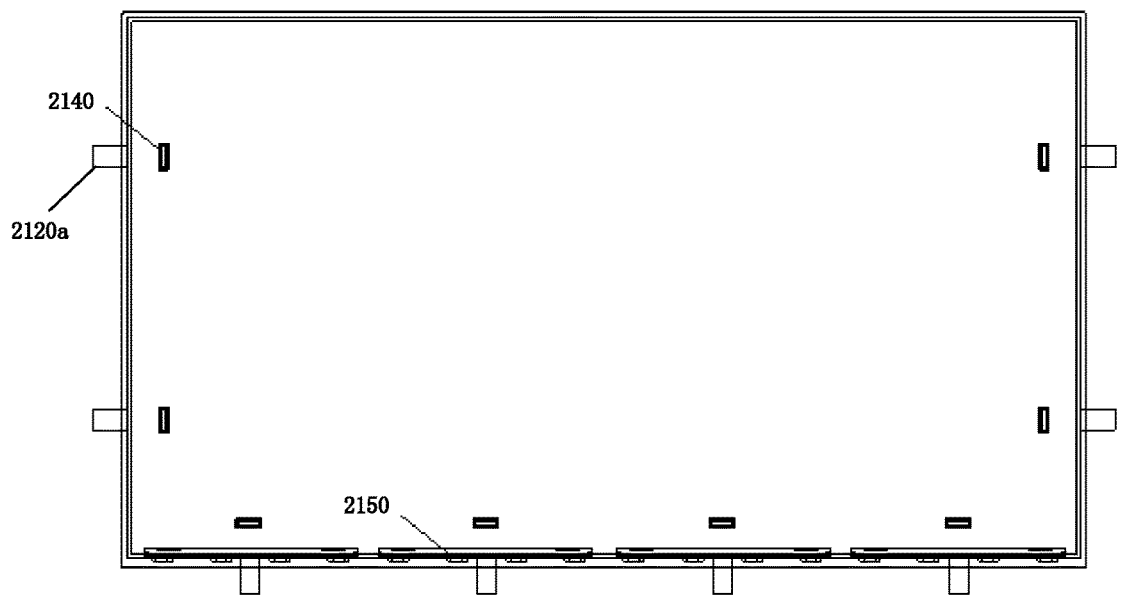

FIGS. 21A-21B are schematic structural views of touch components 2100A and 2100B according to some embodiments of the present disclosure. As shown in FIG. 21A, the touch component 2100A includes a glass layer 2110, a touch film layer 2120 and a display screen layer 2130. Optionally, the glass layer 2110 can be toughened glass or the like, and the display screen layer 2130 can include a liquid crystal layer or the like. The glass layer 2110, the touch film layer 2120 and the display screen layer 2130 can be bonded together, for example, by adhesive bonding. The capacitive touch component 2100A can be arranged on a side of the backlight module close to the optical film layer, and can keep a certain distance from the optical film layer. In some embodiments, in order to achieve the narrow frame of the touch film layer, the outlet position of the touch film layer can be increased during the layout, for example, as shown in FIG. 21A, a plurality of touch film outlet positions (or "outlet positions" for short) 2120a are designed on the left, right and lower sides.

As shown in FIG. 21B, each outlet position 2120a requires a corresponding touch adapter 2140. The connecting line at each outlet position 2120a can be connected to the corresponding touch adapter 2140, which can be located on the second back plate and connected to the touch control panel to realize touch-control function. In addition, optionally, the touch component 2100B can further include other components such as the power circuit board 2150 for connecting to the power supply.

In some embodiments, the touch film outlet position, the position of the touch adapter on the back plate and the position of the terminal unit on the lamp panel can be jointly designed to achieve the optimal layout. For example, in the touch display device, the backlight module can further include a touch adapter arranged on the second back plate, which is arranged along the edge on the side of the second back plate away from the first back plate, and the projection of the touch adapter on the lamp panel unit is located between the adjacent terminal units of the two adjacent sub lamp panels in the fourth direction (such as the vertical direction in FIG. 20A and FIG. 22) of the lamp panel unit, wherein the fourth direction is perpendicular to the third direction (such as the horizontal direction in FIG. 20A and FIG. 22). Optionally, according to the specific application requirements, the touch adapter can include at least one of the capacitive touch adapter and the electromagnetic touch adapter.

Figure 22:
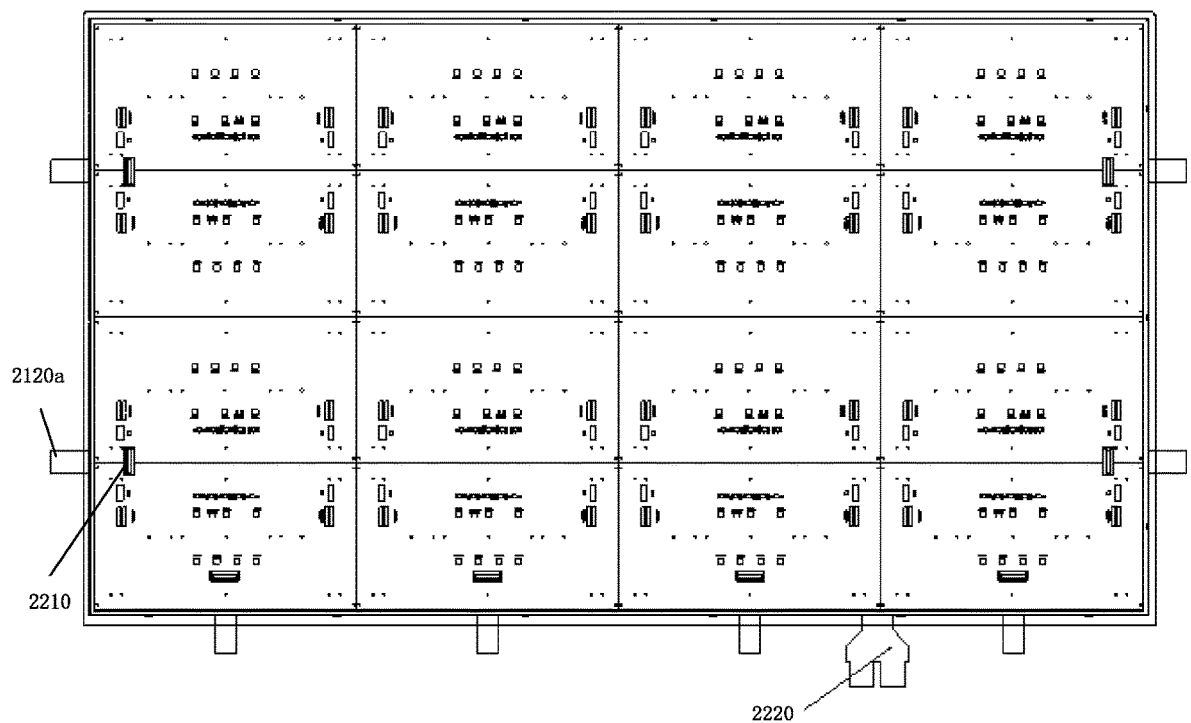
FIG. 22 is a schematic view of an assembly of a lamp panel and a touch component according to some embodiments of the present disclosure.

For example, FIG. 22 is a schematic view of an assembly 2200 of a lamp panel and a touch component according to some embodiments of the present disclosure. As shown in FIG. 22, the projection of the position of each touch adapter 2210 connected with the touch component in the second back plate in the lamp panel formed by splicing a plurality of sub lamp panels can be between the terminal units of the two sub lamp panels, at the left edge and the right edge, spliced in a mirror image way, specifically, between the adjacent terminal units of the two adjacent sub lamp panels in the corresponding lamp panel unit along the fourth direction (such as the vertical direction in FIG. 22). As shown in FIG. 22, the projections of the positions of some other touch adapters 2210 in the second back plate in the lamp panel formed by splicing a plurality of sub lamp panels can be in the sub lamp panel located at the lower edge. As shown in FIG. 22, the position of the touch adapter 2210 can correspond to the touch film outlet position 2120a in the touch component. Optionally, the touch adapter 2210 as shown in FIG. 22 can be a capacitive touch adapter, and the corresponding outlet position can be a capacitive outlet position. The connecting line at the capacitive outlet position can be connected to the corresponding touch adapter 2210. In addition, FIG. 22 schematically shows the electromagnetic outlet position 2220. For example, the electromagnetic outlet position 2220 can be arranged in the middle of the two capacitive outlet positions on the lower right side of FIG. 22. Optionally, a plurality of outlets can be evenly distributed to reduce overlap, so as to avoid adverse effects.

Figure 23:
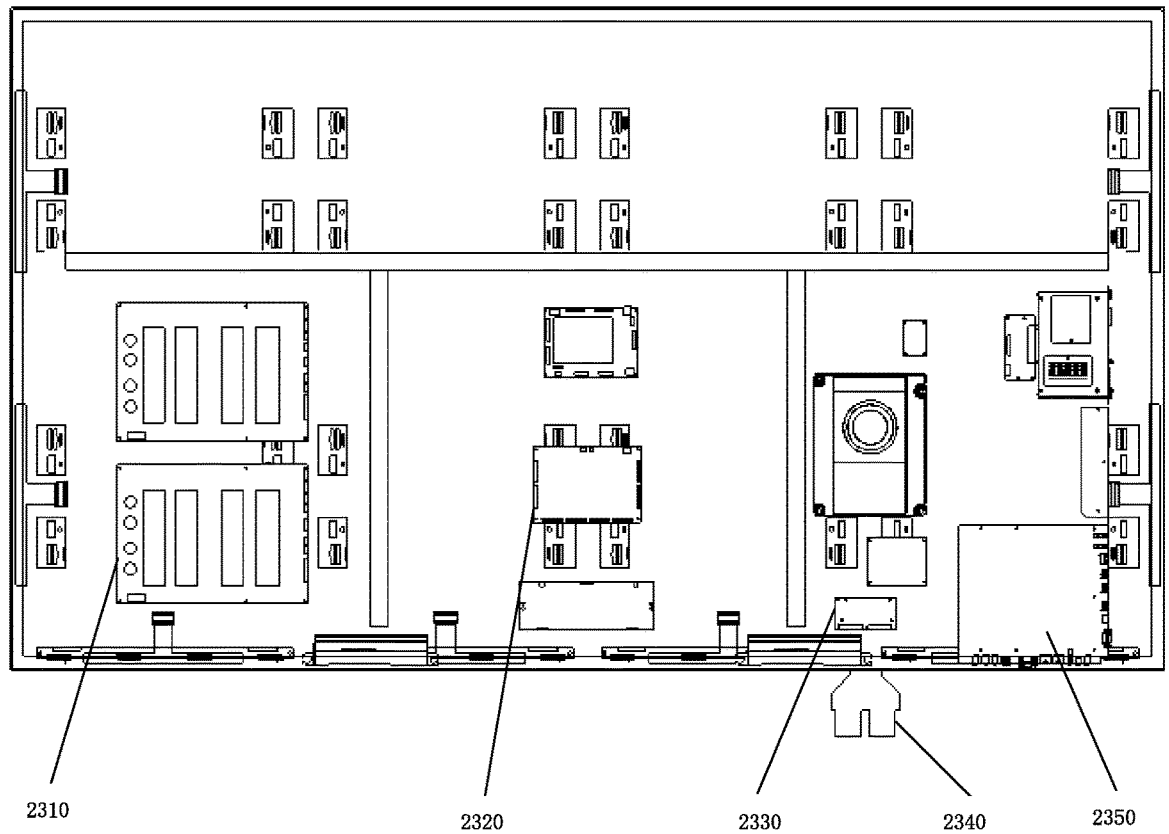
FIG. 23 is a schematic view of the overall circuit board layout according to some embodiments of the present disclosure.

For example, FIG. 23 shows a schematic view of an overall circuit board layout 2300 from the back plate side according to some embodiments of the present disclosure. As shown in FIG. 23, the overall circuit board layout 2300 can be arranged on a side of the second back plate away from the first back plate, and can include a plurality of circuit boards to achieve various functions, such as power supply 2310, capacitive touch panel 2320, electromagnetic touch panel 2330, main board 2350, etc. For example, the connecting line at the electromagnetic outlet position 2340 can be connected to the electromagnetic touch panel 2330. In addition, for example, the power terminal in the terminal unit included in the lamp panel can be directly or indirectly connected to the power supply 2310 through the connecting line, the data terminal can be directly or indirectly connected to the main board 2350 through the connecting line, and the capacitive touch adapter can be directly or indirectly connected to the capacitive touch panel 2320 through the connecting line, and so on.

In the embodiment where there are reinforcing ribs, the reinforcing ribs may obstruct the wiring of various connecting lines. In order to optimize the wiring layout while ensuring the stability of the assembly, at least one wiring port can be arranged on the reinforcing rib to allow some connecting lines to be routed through the wiring port. For example, at least one touch adapter board can include a first port for connecting the touch film and a second port for connecting the touch panel, wherein the connecting line between the second port and the touch panel can be routed through the wiring port arranged on at least one reinforcing rib.

Figure 24A:
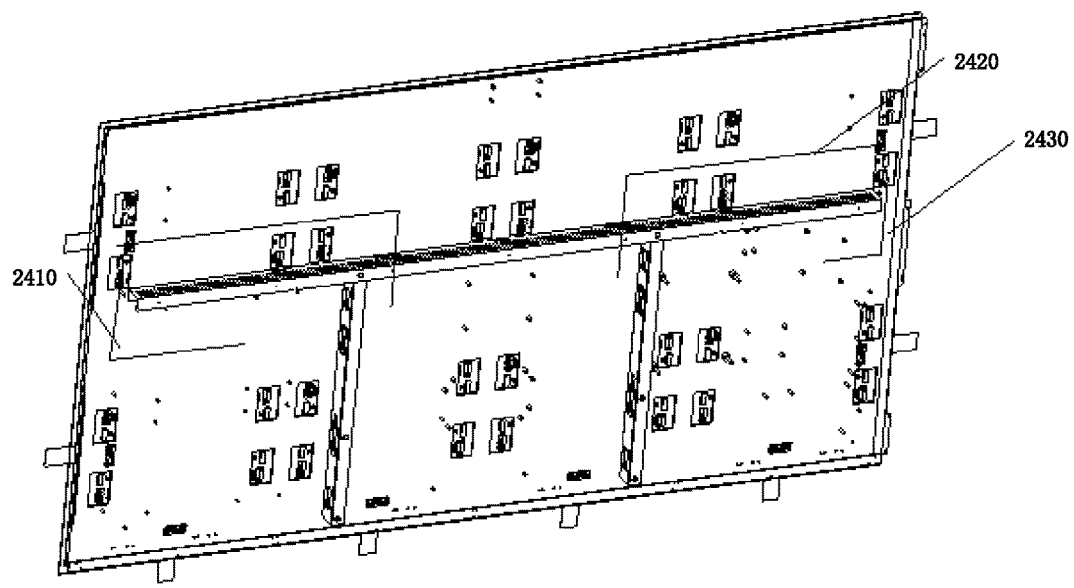
FIGS. 24A-24B are schematic views of overall wiring layout according to some embodiments of the present disclosure.
Figure 24B:
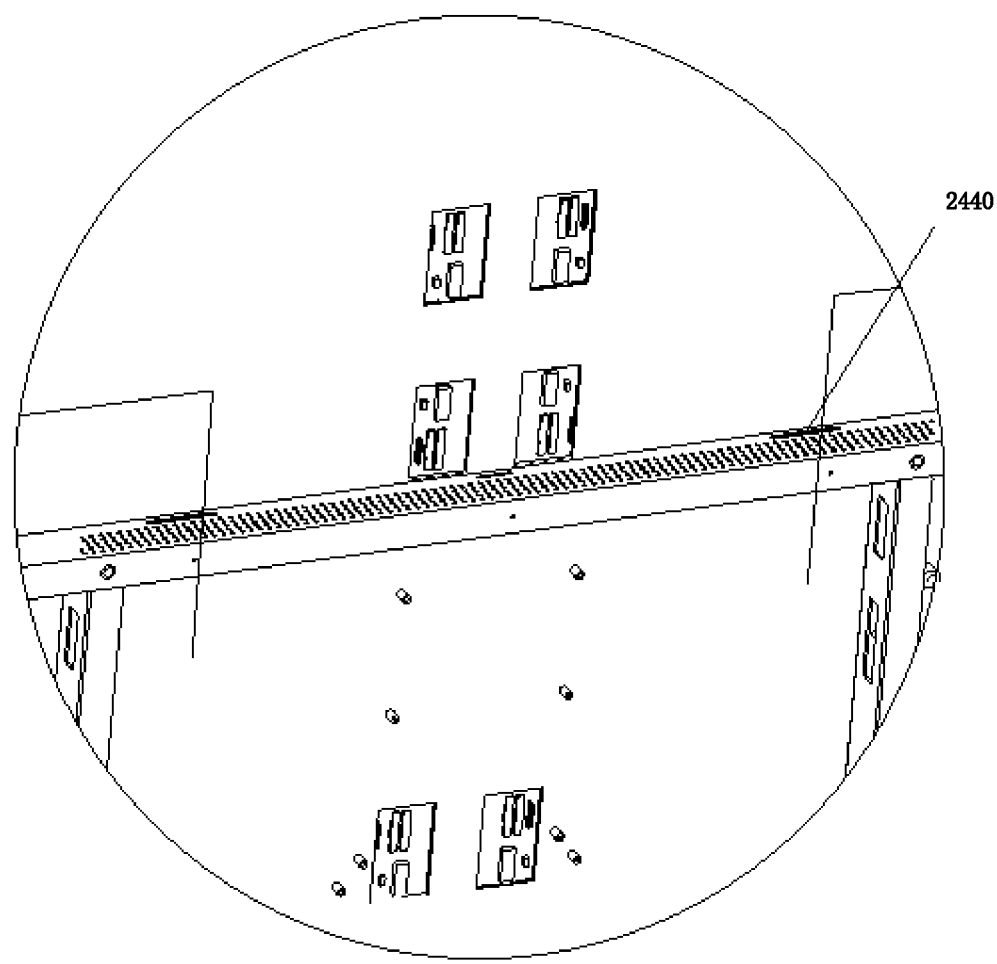

For example, FIGS. 24A-24B are schematic views of an overall wiring layout 2400A and a partial enlarged view 2400B according to some embodiments of the present disclosure. As shown in FIG. 24A, the overall wiring layout can include the lamp panel power connecting line 2410, the touch adapter connecting line 2420 (for example, the capacitive touch adapter connecting line), the lamp panel data connecting line 2430, etc. Similar to FIG. 23, circuit boards such as power supply, touch panel (for example, capacitive touch panel), main board, etc. can be located below the transverse reinforcing rib. Therefore, the connecting line between the terminal unit and the corresponding circuit board above the transverse reinforcing rib needs to be routed to the lower side of the transverse reinforcing rib. According to some embodiments of the disclosure, wiring of different connecting lines can be designed according to the type of connecting lines. For example, the thicker lamp panel power connecting line 2410 and the lamp panel data connecting line 2430 can be routed in the space between the transverse reinforcing rib and the left and right edges. In order to avoid interference, the touch adapter connecting line 2420 should be routed separately from the power connecting line 2410 of the lamp panel as far as possible. Therefore, one or more wiring ports can be arranged at the appropriate position of the transverse reinforcing rib, so that the touch adapter connecting line 2420 can pass through such wiring ports and be connected to the touch panel below. Since the thickness of the touch adapter connecting line 2420 is relatively small, one or more wiring ports on the reinforcing rib will not significantly affect its strength. For example, as shown in FIG. 24B, two wiring ports, i.e., the left and right wiring ports 1440, can be arranged in the middle part of the transverse reinforcing rib, so that the touch adapter connecting lines 2420 on the left and right sides can respectively pass through the corresponding wiring ports 1440 for wiring. It should be understood that, according to the actual needs, more or less wiring ports can be arranged on the transverse reinforcing rib, or one or more wiring ports can be arranged on the vertical reinforcing rib alternatively or additionally. In addition, the circuit board layout and wiring layout in the figures are only schematic, and other circuit board layouts can be designed according to actual needs, as well as other wiring layouts according to the concept of the disclosure.

By studying the drawings, the disclosure and the appended claims, those skilled in the art can understand and realize the variations of the disclosed embodiments when practicing the claimed subject matter. In the claims, the word "comprising" does not exclude other elements or steps, and "a" or "an" does not exclude a plurality. The mere fact that certain measures are recited in mutually different dependent claims does not mean that the combination of these measures cannot be used for advantages.

In the description of this specification, the description of the terms "one embodiment", "some embodiments", "examples", "specific examples" or "some examples" means that the specific features, structures, materials or characteristics described in connection with this embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner. In addition, those skilled in the art can combine different embodiments or examples and features of different embodiments or examples described in this specification without contradicting each other.

The invention claimed is:

1. A backlight module, comprising:
   a lamp panel comprising a first surface and a second surface opposite to each other, wherein the first surface comprises a light source array, and the second surface comprises a light source array driving circuit and an external terminal;
   a first back plate connected with the lamp panel at a side of the second surface of the lamp panel, and comprising first avoiding openings corresponding to the light source array driving circuit and the external terminal;
   a second back plate connected with the first back plate at a side of the first back plate away from the lamp panel, and comprising a second avoiding opening corresponding to the external terminal
   an optical film layer located on the first surface of the lamp panel;
   a film layer fixing member for fixing the optical film layer, the film layer fixing member comprising a film layer frame for supporting the optical film layer at its edge;
   at least one light-transmitting support column comprising a base portion and a protrusion portion located on an upper surface of the base portion, the protrusion portion passing through the lamp panel and protruding from a side of the first surface of the lamp panel to support the optical film layer,
   wherein the first back plate further comprises a third avoiding opening corresponding to the at least one light-transmitting support column, so that the base portion of the at least one light-transmitting support column is clamped between the lamp panel and the second back plate.

2. The backlight module according to claim 1, wherein the second back plate is connected with the first back plate by riveting or gluing.

3. The backlight module according to claim 1, wherein the first back plate is made of a first material, the second back plate is made of a second material, and strength of the second material is higher than that of the first material.

4. The backlight module according to claim 1, wherein thickness of the first back plate is greater than that of the second back plate.

5. The backlight module according to claim 1, wherein at least a part of an edge of the second back plate extends beyond an edge of the first back plate.

6. The backlight module according to claim 1, wherein the upper surface of the base portion of the light-transmitting support column is attached to the second surface of the lamp panel.

7. The backlight module according to claim 1, wherein the protrusion portion comprises a platform portion and a column portion, the column portion is located between the base portion and the platform portion, and a lower bottom surface of the platform portion is connected with the column portion, the lower bottom surface area of the platform portion is smaller than the bottom surface area of the column portion, and the height of the platform portion is greater than that of the column portion.

8. The backlight module according to claim 1, wherein the lamp panel further comprises a reflector arranged on the first surface, the reflector comprises:
- a fourth avoiding opening corresponding to the light-transmitting support column, wherein a shape of the fourth avoiding opening is same as that of the lower bottom surface of the platform portion of the light-transmitting support column, and an area of the fourth avoiding opening is less than that of the lower bottom surface of the platform portion of the light-transmitting support column; and
- an incision extending outwards from an edge of the fourth avoiding opening.

9. The backlight module according to claim 8, wherein the fourth avoiding opening is round, and a diameter of the fourth avoiding opening is 10%-20% smaller than a diameter of the lower bottom surface of the platform portion of the light-transmitting support column.

10. The backlight module according to claim 1, wherein the film layer frame comprises a first side frame, and the first side frame comprises:
- a side frame portion and a support platform, wherein the support platform comprises a first supporting surface and a second supporting surface which are opposite to each other, the first supporting surface is engaged with the first back plate, and the second supporting surface is configured to support the optical film layer.

11. The backlight module according to claim 10, wherein the film layer frame further comprises a second side frame, the second side frame and the first side frame are connected to each other by splicing.

12. The backlight module according to claim 10, wherein the first side frame is further provided with at least one film layer pressing sheet, the at least one film layer pressing sheet comprises a first extension, a second extension and a bent portion between the first extension and the second extension, wherein the first extension is engaged with the side frame portion and the second extension is pressed against the optical film layer.

13. The backlight module according to claim 1, wherein the external terminal comprises a plurality of terminal units, each of the plurality of terminal unit comprising:
- a first terminal and a second terminal arranged adjacent to each other, wherein an interface of the first terminal is located at a side of the first terminal away from the second terminal, and an interface of the second terminal is located at a side of the second terminal away from the first terminal.

14. The backlight module according to claim 13, wherein the first terminal and the second terminal are data terminals connected to the same light source array driving circuit.

15. The backlight module according to claim 14, wherein the terminal unit further comprises a power supply terminal.

16. The backlight module according to claim 14, wherein the lamp panel comprises two sub lamp panels spliced in mirror image mode, and the two sub lamp panels spliced in the mirror image mode are the same.

17. The backlight module according to claim 16, wherein the lamp panel comprises at least one lamp panel unit, and each lamp panel unit comprises a plurality of sub lamp panels, each of the plurality of sub lamp panels comprising two terminal units, the two terminal units being respectively arranged along two opposite side edges of the sub lamp panel in a third direction, and any two adjacent sub lamp panels in the plurality of sub lamp panels in the third direction being connected by adjacent terminal units.

18. The backlight module according to claim 17, further comprising:
- a touch adapter, which is arranged along an edge on a side of the second back plate away from the first back plate, and a projection of the touch adapter on the lamp panel unit is located between the adjacent terminal units of two sub lamp plates adjacent in a fourth direction in the lamp panel unit, wherein the fourth direction is perpendicular to the third direction.

19. The backlight module according to claim 18, wherein the touch adapter comprises at least one of a capacitive touch adapter and an electromagnetic touch adapter.

20. A display device, comprising the backlight module according to claim 1.

21. The display device according to claim 20, further comprising an overall machine frame, wherein an edge of the second back plate of the backlight module is connected with the overall machine frame.

* * * * *